US 6,749,158 B2

(12) United States Patent
Timm

(10) Patent No.: US 6,749,158 B2
(45) Date of Patent: *Jun. 15, 2004

(54) COMPUTER KEYBOARD AND MOUSE SUPPORT HAVING MOVEABLE MOUSE EXTENSION

(75) Inventor: Derek Timm, Windsor, CA (US)

(73) Assignee: Work-Rite Ergonomic Accessories, Inc., Petaluma, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 10/153,984

(22) Filed: May 23, 2002

(65) Prior Publication Data

US 2002/0179781 A1 Dec. 5, 2002

Related U.S. Application Data

(63) Continuation-in-part of application No. 09/383,974, filed on Aug. 26, 1999, now Pat. No. 6,497,391, which is a continuation-in-part of application No. 09/135,322, filed on Aug. 7, 1998, now Pat. No. 6,045,098.

(51) Int. Cl.[7] .................................................. B68G 5/00

(52) U.S. Cl. ............... 248/118; 248/118.1; 248/346.01; 248/918; 108/50.02

(58) Field of Search ............................. 248/118, 118.1, 248/918, 346.04, 118.3; 312/208.1, 223.3, 223.6; 108/92, 93, 102, 50.02

(56) References Cited

U.S. PATENT DOCUMENTS

| 64,170 A | 4/1867 | Gaasbeek |
| 170,837 A | 10/1875 | Finfrock |
| 1,867,462 A | 7/1932 | Thompson |

(List continued on next page.)

OTHER PUBLICATIONS

1) Two page brochure entitled "TALKMASTER Telephone Swivel Arms The Perfect Base for Communication" published by Talkmaster Telephone Arms, published on Mar. 10, 1996.
2) Three pages printout downloaded from Steelcase Inc. web site featuring various products including the Steelcase Stella Keyboard Support, publication date unknown. Third page of printout includes a copyright notice as follows: "© 1996–2000 STeelcase Inc.".
3) Two pages (front page and p. 134) from catalog entitled "Corporate Express The World's Corporate Supplier In–Stock Products 1997" published by Corporate Express, p. 134, featuring various Rubbermaid products, publication date 1997.

(List continued on next page.)

Primary Examiner—Kimberly Wood
(74) Attorney, Agent, or Firm—Watts, Hoffmann Co., LPA

(57) ABSTRACT

A keyboard and mouse support includes a keyboard support body and a mouse support. The keyboard support body includes a throughpassage that passes through the support body and opens on opposite sides of the support body. The keyboard support body also defines a support surface configured to accommodate a keyboard. A back side of the keyboard support includes a back wall defining an arcuate slotted document holder and a pair of passageways for receiving a keyboard cord. A moveable mouse support fits within a portion of the throughpassage of the support and extends outwardly from the support to define left and right hand mouse support surfaces. The mouse support includes an upwardly protruding elongated bead spaced inwardly from a rearward edge of the mouse support. The bead prevents a mouse placed on either of the two mouse support surfaces from sliding off the back edge of the mouse support if the mouse support is inclined at a negative angle. A wrist support is affixed to an upper support surface of the keyboard support body using a plurality of ball catch type fasteners. In one preferred embodiment, the keyboard support body includes an injected molded plastic upper piece and a stamped metal lower piece which are affixed by mechanical fasteners.

52 Claims, 10 Drawing Sheets

U.S. PATENT DOCUMENTS

| | | | |
|---|---|---|---|
| 2,182,703 A | | 12/1939 | Rainwater |
| 3,637,278 A | | 1/1972 | Easterbrooks |
| 3,983,976 A | | 10/1976 | Taylor |
| 4,206,546 A | | 6/1980 | Runnells et al. |
| 4,635,893 A | * | 1/1987 | Nelson ........................ 248/558 |
| 4,863,124 A | * | 9/1989 | Ball et al. ...................... 108/28 |
| 4,953,716 A | | 9/1990 | Rapoport |
| D314,565 S | * | 2/1991 | Davis et al. ................ D14/455 |
| D314,566 S | * | 2/1991 | Davis et al. ................ D14/455 |
| D316,115 S | * | 4/1991 | Davis et al. .................. D19/91 |
| 5,242,139 A | | 9/1993 | Aldrich |
| 5,273,250 A | | 12/1993 | Pemberton |
| D357,241 S | | 4/1995 | Rossman |
| D357,910 S | | 5/1995 | Newhouse |
| 5,463,925 A | | 11/1995 | Galocy |
| 5,490,647 A | | 2/1996 | Rice |
| 5,509,628 A | | 4/1996 | Noble |
| 5,522,323 A | | 6/1996 | Richard |
| 5,522,572 A | * | 6/1996 | Copeland et al. ............ 248/118 |
| 5,558,419 A | | 9/1996 | Dasher |
| 5,564,667 A | | 10/1996 | Copeland et al. |
| 5,583,496 A | | 12/1996 | Sharpe, III et al. |
| 5,584,596 A | | 12/1996 | Greene |
| 5,595,428 A | * | 1/1997 | Huang ...................... 312/223.3 |
| 5,612,691 A | | 3/1997 | Murmann et al. |
| 5,628,483 A | | 5/1997 | Smith et al. |
| D380,462 S | | 7/1997 | Wilson |
| 5,653,413 A | | 8/1997 | Fink |
| 5,655,743 A | | 8/1997 | Gillis |
| 5,667,320 A | | 9/1997 | Ambrose et al. |
| 5,683,064 A | | 11/1997 | Copeland et al. |
| 5,692,815 A | | 12/1997 | Murphy |
| 5,704,298 A | | 1/1998 | Corpuz, Jr. |
| 5,704,299 A | | 1/1998 | Corpuz, Jr. |
| 5,704,698 A | | 1/1998 | Lin |
| D391,941 S | | 3/1998 | Brunner |
| 5,730,403 A | | 3/1998 | Johnson |
| 5,732,910 A | | 3/1998 | Martin |
| 5,775,663 A | * | 7/1998 | Fitzsimmons et al. ....... 248/450 |
| 5,803,416 A | | 9/1998 | Hanson et al. |
| 5,813,741 A | | 9/1998 | Fish |
| 5,833,923 A | | 11/1998 | McClintock |
| 5,857,415 A | | 1/1999 | Richard |
| 5,857,654 A | * | 1/1999 | Berman .................... 248/441.1 |
| 5,890,694 A | | 4/1999 | Possick |
| 5,901,934 A | | 5/1999 | Wilson |
| D410,453 S | | 6/1999 | Timm |
| 5,911,398 A | * | 6/1999 | VanLandingham, Jr. . 248/441.1 |
| 5,915,655 A | | 6/1999 | Gutowski |
| 5,938,352 A | | 8/1999 | Chen |
| 6,003,446 A | * | 12/1999 | Leibowitz ..................... 108/43 |
| 6,045,098 A | | 4/2000 | Timm |
| 6,079,676 A | * | 6/2000 | Hackett et al. .............. 248/118 |
| 6,105,508 A | * | 8/2000 | Ryburg ......................... 108/42 |
| 6,234,085 B1 | * | 5/2001 | Ramundo ..................... 108/43 |
| 6,349,915 B1 | * | 2/2002 | Jones et al. .............. 248/442.2 |
| 6,353,530 B1 | * | 3/2002 | Zarek et al. ................. 361/683 |
| 6,497,391 B1 | * | 12/2002 | Timm ......................... 248/118 |

OTHER PUBLICATIONS

4) Two page brochure featuring various products of ISE, Inc., publication date unknown. The ISE brochure was obtained by Applicant's assignee at an industry trade show in Chicago, Illinois on Jun. 8, 1999.

5) Fifteen page price list entitled "U.S. Wrist Rest, Foot Rest and Combo–Platform Price List" published by ISE, Inc., publication date Sep. 1994.

6) Fourteen page catalog entitled "Welcome to the World of Visual Ergonomics User Friendly Accessories for Today's Workplace! 1996 Catalog" published by ISE, Inc., published in 1996.

7) Six page brochure entitled "The ABC's of Office Ergonomics" published by WorkRite Ergonomic Accessories, Inc., publication date unknown. To the best of Applicant's knowledge, this brochure was published at least as early as 1996.

8) Four page product brochure entitled "Introducing . . . Rite–In–Line Document and Writing Platform" published by WorkRite Ergonomic Accessories, Inc., publication ate unknown. To the best of Applicant's knowledge, this brochure was published at least as early as 1997.

9) Four page product prochure entitled "Introducing . . . PowerLift Sit–Stand Work Surface" published by WorkRite Ergonomic Accessories, Inc., publication date unknown. To the best of Applicant's knowledge, this brochure was published at least as early as Jul. 1996.

10) Four page product brochure entitled "PowerLift Mechanisms for Sit–Stand Applications" published by WorkRite Ergonomic Accessories, Inc., publication date unknown. To the best of Applicant's knowledge, this brochure was published at least as early as Jun. 1997.

11) Nine page price list and brochure for various products of WorkRite Ergonomic Accessories, inc., price list date Feb. 1, 1994.

12) Twenty–one page catalog and price list entitled "General Service Administration Feder Supply Service Authorized Federal Supply Schedule Pricelist Sep. 1, 1996" published by WorkRite Ergonomic Accessories, Inc., price list date Sep. 1, 1996.

13) Four page brochure entitled "Introducing Rite–In–Touch™ Telephone Arm" published by WorkRite Ergonomic Accessories, Inc., copyright, 1997.

14) Six page product brochure entitled "NeutraLift™ Height Adjustable Counter–Balanced Tables" published by WorkRite Ergonomic Accessories, Inc., copyright 1998.

15) Four page product brochure "Fall 1998 New Products Introducing the . . . Banana–Board™ and the PINNACLE™ Arm Series" published by WorkRite Ergonomic Accessories, Inc., printed in Fall 1998.

16) Eighteen page catalog entitled "WorkRite® Ergonomic Accessories, Inc." published by WorkRite Ergonomic Accessories, Inc., printed in Oct. 1994.

17) Twenty page catalog entitled "WorkRite® Ergonomic Accessories, Inc. Feb. 1995" published by WorkRite Ergonomic Accessories, Inc., printed in Feb. 1995.

18) Twenty–three page catalog entitled "WorkRite Ergonomics Spring 1996 Catalog" published by WorkRite Ergonomic Accessories, Inc., printed in Fall 1995.

19) Twenty–three page catalog entitled "WorkRite Ergonomics Spring 1996 Catalog" published by WorkRite Ergonomic Accessories, Inc., printed in Spring 1996.

20) Twenty–five page catalog entitled "WorkRite® Ergonomics Spring 1997 Catalog" published by WorkRite Ergonomic Accessories, Inc., printed in Dec. 1996.

21) Thirty–eight page catalog entitled "WorkRite® Ergonomics Fall 1997 Catalog" published by WorkRite Ergonomic Accessories, Inc., printed in Fall 1997.

22) Thirty–eight page catalog entitled "WorkRite® Ergonomics Spring 1998 Catalog" published by WorkRite Ergonomic Accessories, Inc., printed in Spring 1998.

23) Fifty–page catalog entitled "WorkRite® Ergonomics 1999 Catalog" published by WorkRite Ergonomic Accessories, Inc., copyright 1999.

* cited by examiner

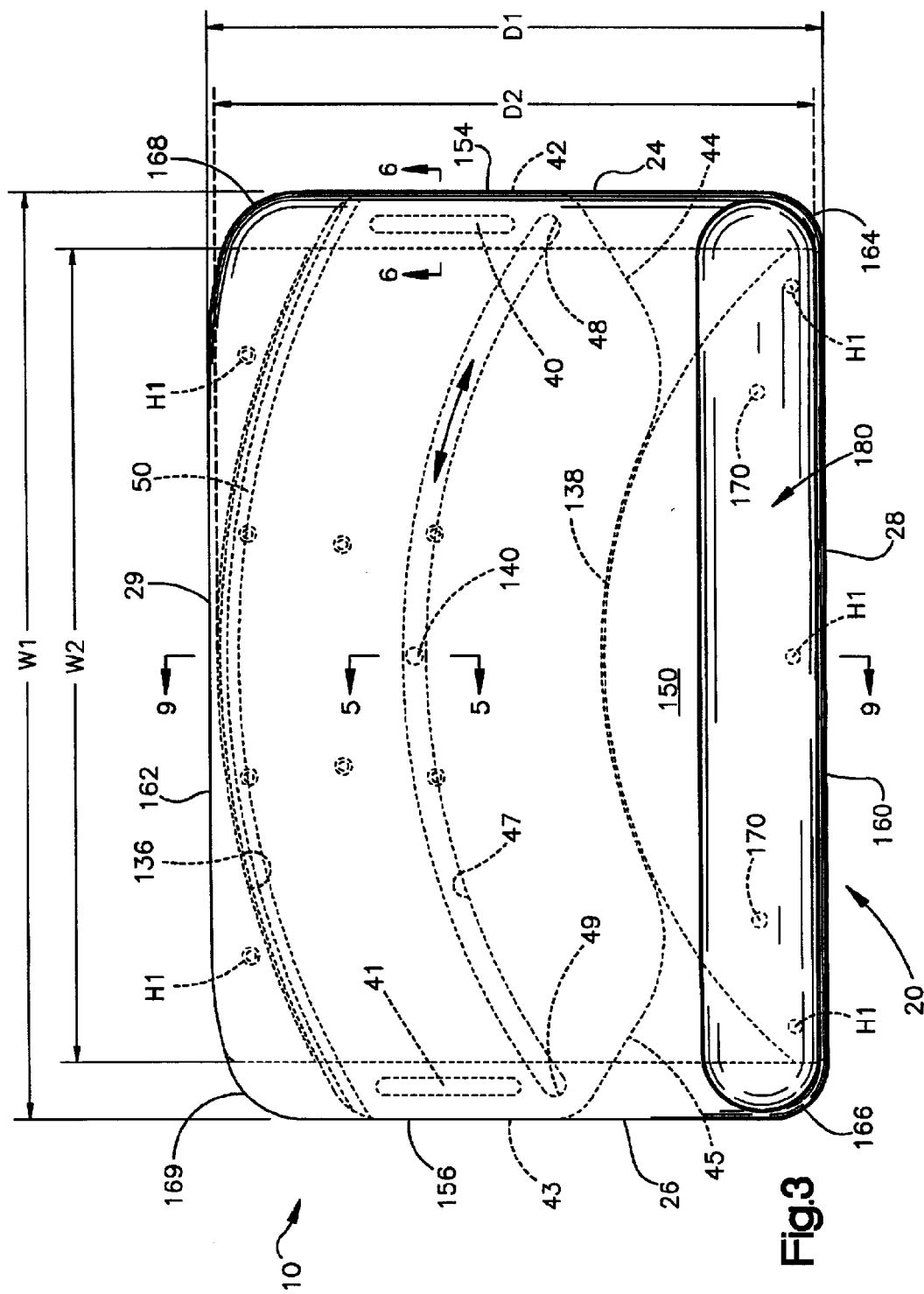

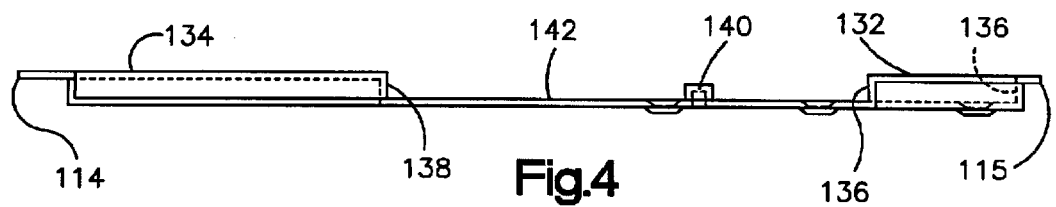
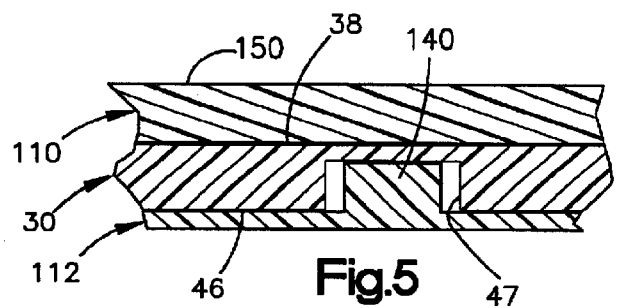
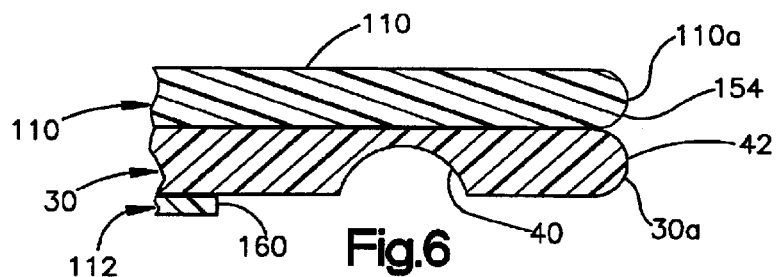
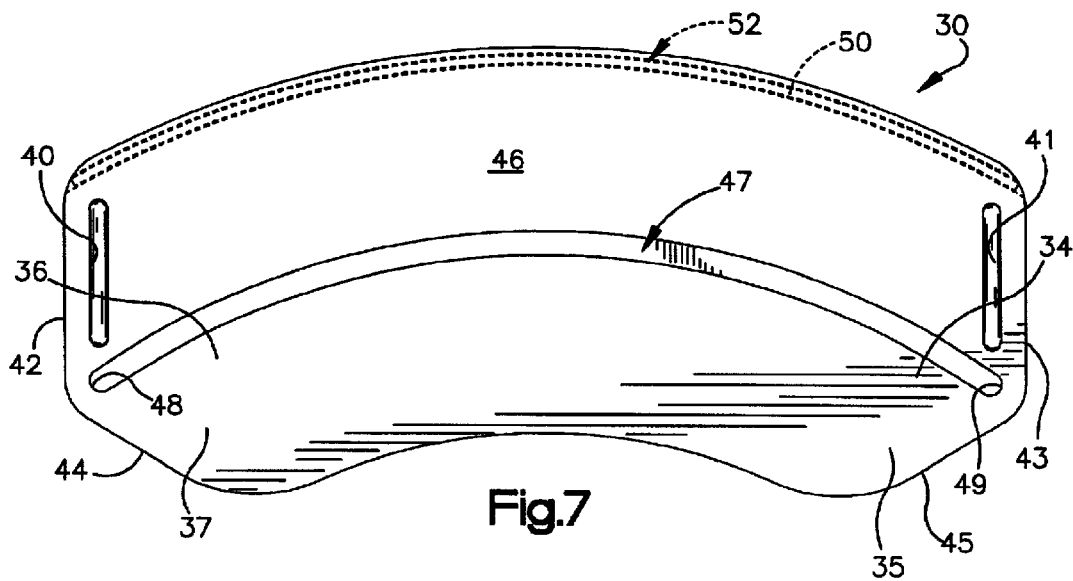

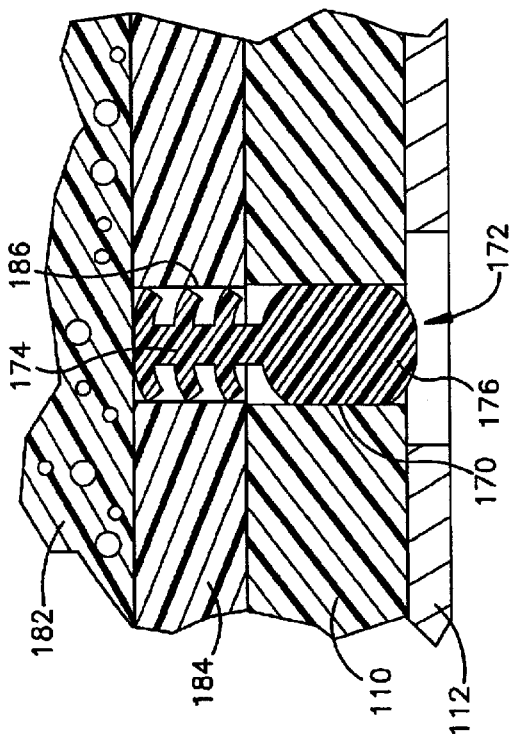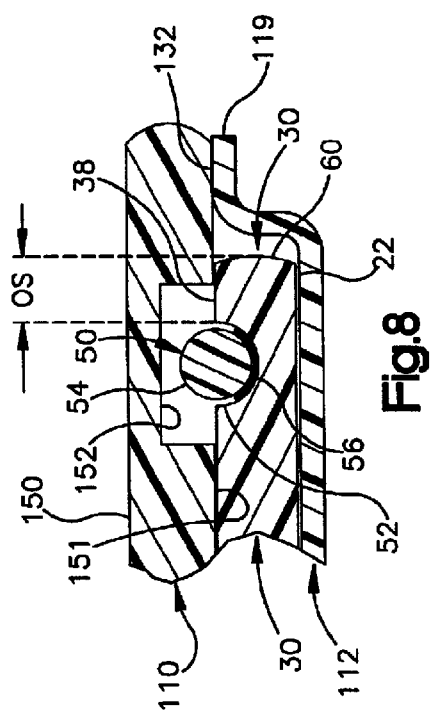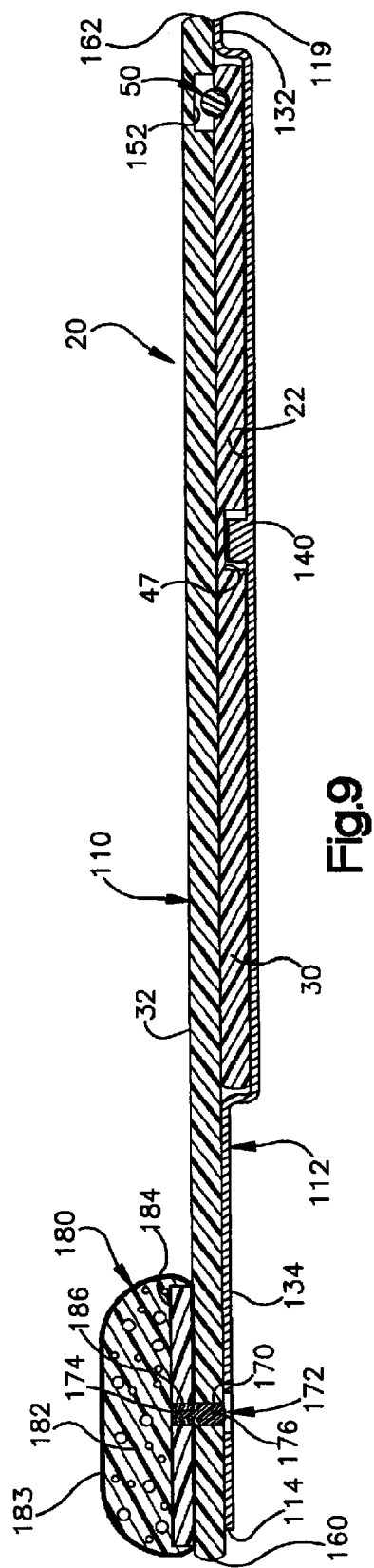

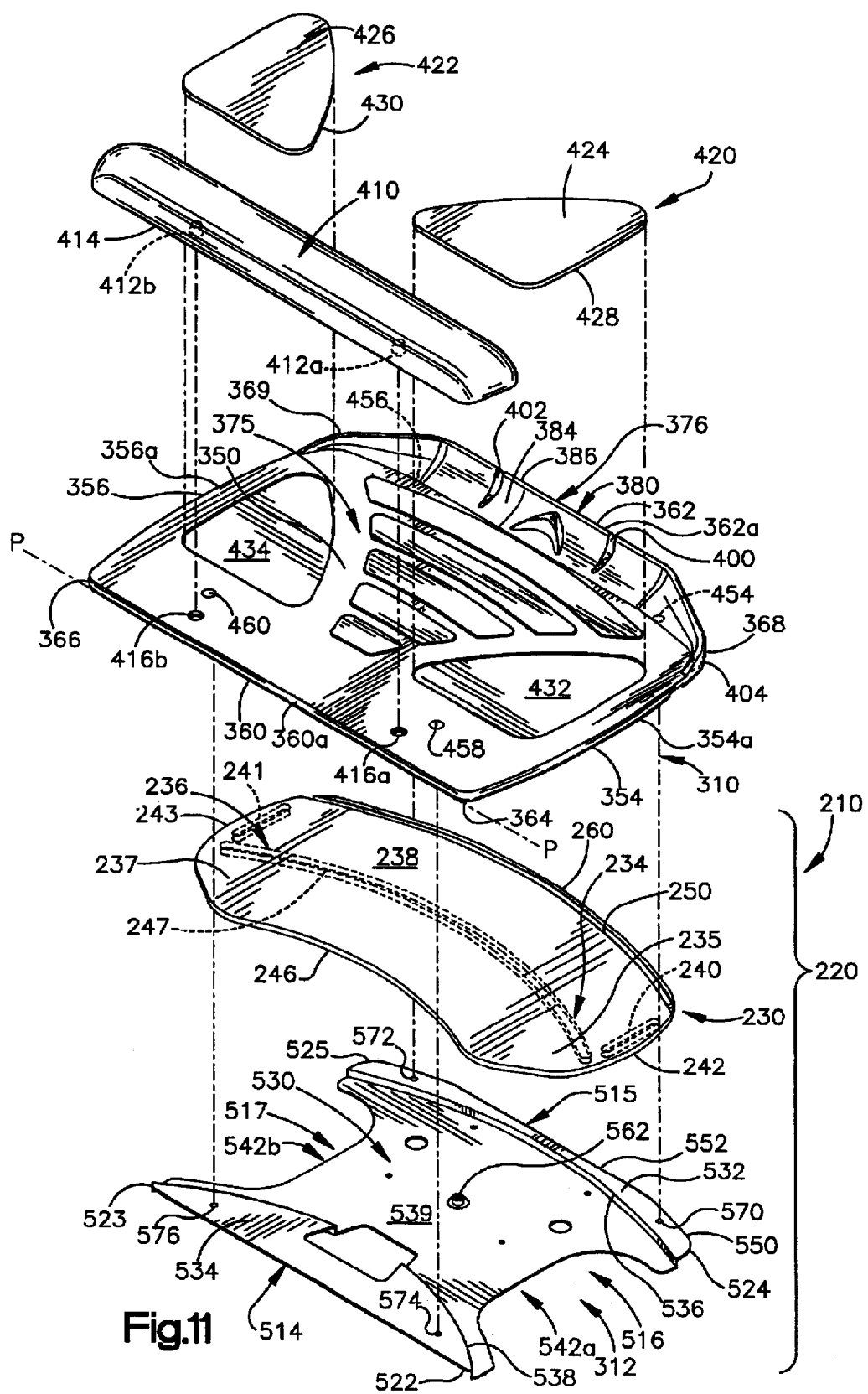

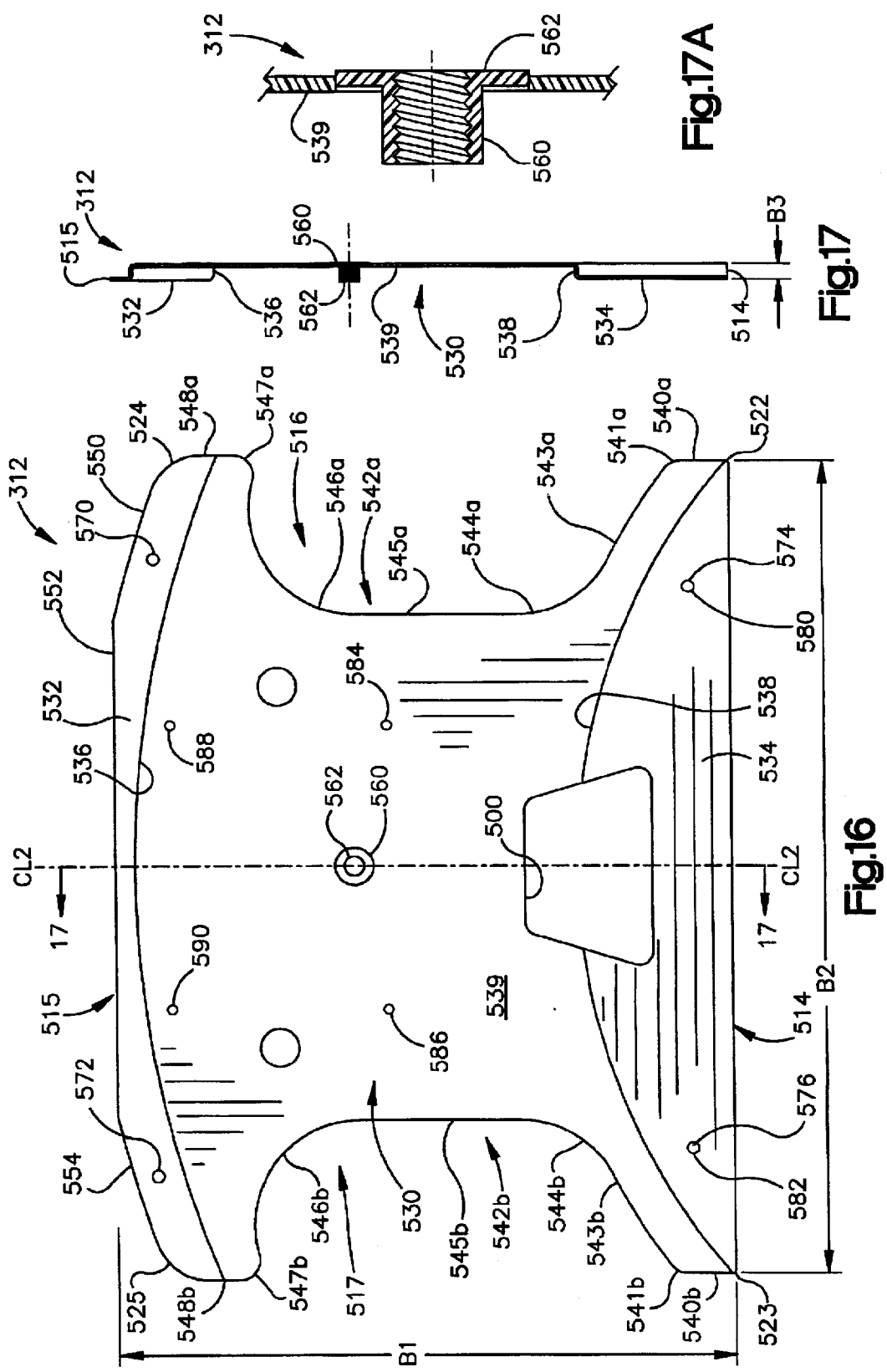

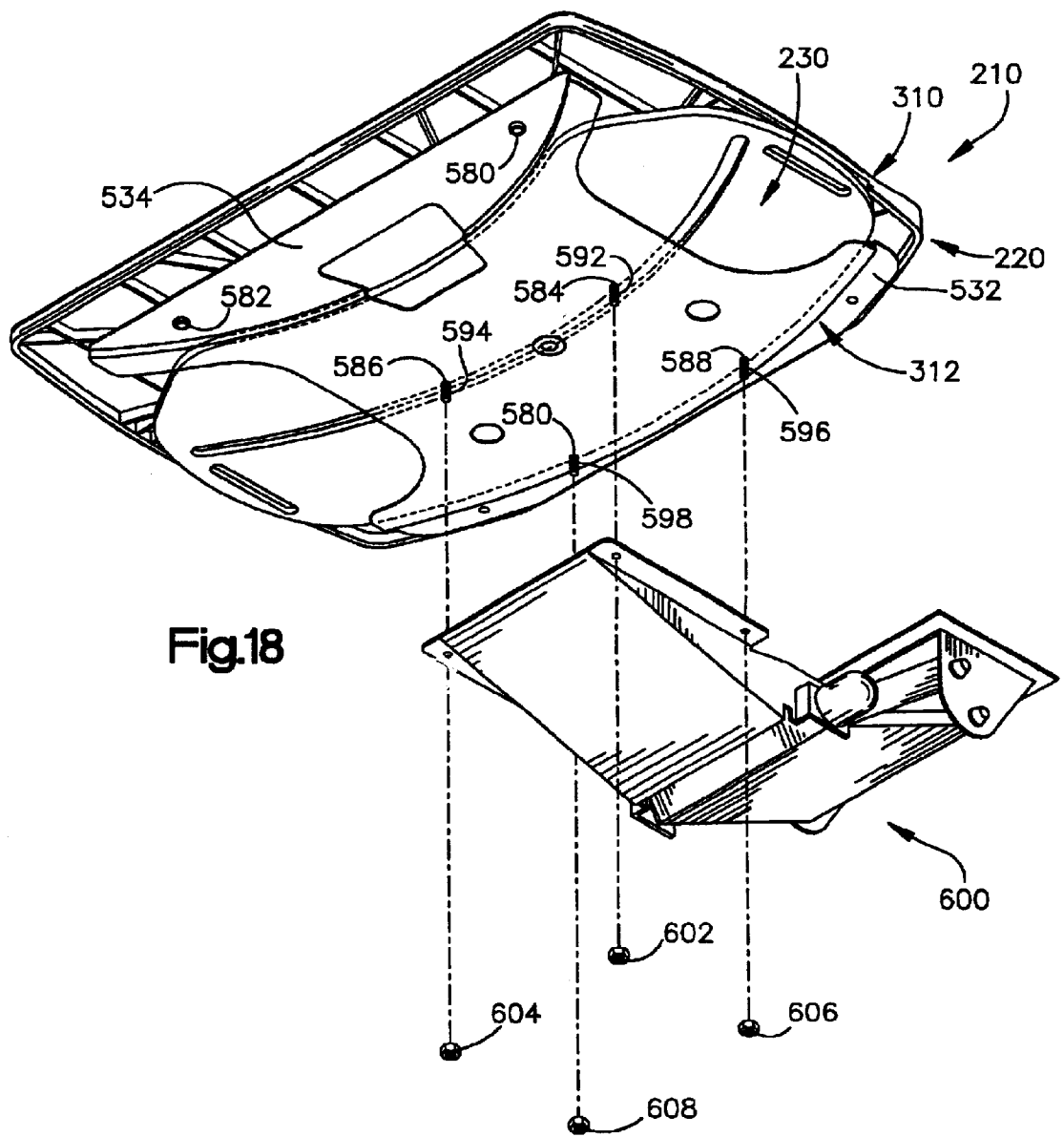

COMPUTER KEYBOARD AND MOUSE SUPPORT HAVING MOVEABLE MOUSE EXTENSION

RELATED APPLICATION

This application is a continuation-in-part of U.S. patent application Ser. No. 09/383,974, filed Aug. 26, 1999, now issued as U.S. Pat. No. 6,497,391 on Dec. 24, 2002, which, in turn, is a continuation-in-part of U.S. patent application Ser. No. 09/135,322, filed on Aug. 7, 1998, now issued as U.S. Pat. No. 6,045,098 on Apr. 4, 2000.

FIELD OF THE INVENTION

The present invention concerns a computer keyboard support having a movable extension that supports a data input device, such as a mouse, for controlling a cursor position on a computer viewing screen.

BACKGROUND ART

The personal computer revolution has placed personal computers and computer terminals on corporate and home desktops throughout the world. Almost all such computers and terminals allow data entry through an alphanumeric keyboard. Often such a keyboard rests on a level desktop surface which is the same as the surface that supports a computer base unit and a viewing monitor or screen.

Especially when the user must work at the computer for long periods of time, it is important to be able to adjust the position and/or orientation of the keyboard. Built in tabs that form an integral part of the keyboard allow for limited tilt adjustment. To allow more flexibility in positioning a keyboard to suit a user's ergonomic requirements, however, the keyboard needs its own support.

Different types of keyboard supports are sold by Work-Rite Ergonomic Accessories, Inc., the assignee of the present invention. One such keyboard support is movably supported by a track and support mechanism that allows the keyboard to be moved out from under a user's desk and then stored beneath the desk when the keyboard is not in use. This keyboard support also allows the user to adjust both the angle and the height of the keyboard in relation to the user.

A common personal computer input device that has received wide acceptance is a two dimensional input control device commonly referred to as a "mouse." As the mouse is moved over a flat surface a roller that extends from a bottom of the mouse rotates and this rotation is translated into electrical signals that are transmitted to an interface of the personal computer. The movement of the mouse on the surface causes a corresponding movement of an arrow on the computer screen. By moving the arrow to point at a desired icon, function block, dialog box, or pull down menu, the user can actuate switches on the mouse to select or pick icons, or functions, actuate pull-down menus, select a block of text for editing, enter data, etc.

U.S. Pat. No. 5,655,743 to Gillis concerns a keyboard tray which is formed from two relatively shallow molded bodies united along a periphery to define a relatively flat, internal chamber through either of opposite side edges of the keyboard support or tray. A mouse tray can project outwardly of the internal chamber through either of opposite side edges of the keyboard support.

SUMMARY OF THE INVENTION

One exemplary embodiment of the present invention concerns a keyboard and mouse support for a personal computer. The keyboard and mouse support includes a keyboard support and a moveable support adapted to support a moveable pointer input device, such as a mouse. To accommodate the moveable mouse support, the keyboard support includes a support body having a throughpassage that passes through the support body and opens on opposite sides of the support body. The moveable support is slidably positioned in the throughpassage. The support body defines a support surface configured to accommodate an alphanumeric keyboard for inputting signals corresponding to alphanumeric symbols to the computer.

The mouse or pointer device typically includes a roller that requires a generally flat surface for its support and rotation of the roller. Although the term "mouse" has become almost universally used for a moveable pointer input device, other terms such as "trackball" can be used interchangeably with the term "mouse."

The moveable support or moveable mouse support fits within a portion of the throughpassage of the keyboard support and can be extended outwardly from the keyboard support to define a mouse support surface. A portion of the mouse support extends in front of a front edge of a keyboard as the keyboard rests on the keyboard support surface.

The exemplary keyboard and mouse support includes a keyboard support body having a curved slot that extends through the support body. The keyboard support also includes a moveable mouse support that defines an arcuate body that fits within the curved slot of the support body and can be pushed back and forth through the curved slot to extend beyond one or the other side of the keyboard support body. Due to its curved or arcuate shape of the mouse support, an exemplary embodiment of the moveable mouse support defines a work region that extends beyond a front edge of the keyboard support body.

Advantageously, the mouse support includes an upwardly protruding bead that extends just inward of a back edge of the mouse support. The bead prevents a mouse placed on either of the two mouse support work regions from sliding off the back edge of the mouse support. If the keyboard and mouse support is adjusted to a negative angle, the mouse would tend to roll off the back of the mouse support if no bead were present along the back edge of the mouse support. A negative angle of the mouse and keyboard support is one in which the front edge (the edge facing toward the user) of the keyboard support is vertically above the back edge (the edge facing toward the monitor) of the keyboard support. The bead may be a cylindrical shaped length of rubber or plastic, such as a length of material forming a conventional O-ring. Preferably, the bead is seated in an arcuate recess or groove in an upper surface of the mouse support. The bead may be adhesively affixed in the recess and a portion of the bead extends above the upper surface of the mouse support. The mouse support recess is generally parallel to the back edge of the mouse support and is disposed just inward from the back edge. Preferably, a surface of the keyboard support body bounding the throughpassage also includes a corresponding groove or recess aligned with the mouse support recess to receive the upper portion of the bead extending above the mouse support upper surface.

In another exemplary embodiment of the present invention, a keyboard and mouse support for a personal computer is disclosed wherein the keyboard support body is fabricated of injection molded plastic for a reduction in weight. A rearward portion of the keyboard support includes a curved wall which defines a curved slot adapted to hold a document and a pair of tapered slots for securing a cord of a keyboard supported by the keyboard support. An upper surface of the keyboard support includes a pair of resilient pad for cushioning and gripping a bottom surface of a keyboard.

These and other objects, advantages, and features of the exemplary embodiment of the invention are described in detail in conjunction with the accompanying drawings.

BRIEF DESCRIPTION OF THE DRAWINGS

FIG. 1 is a perspective view of a first preferred embodiment of a keyboard and mouse support of the present invention;

FIG. 2 is an exploded perspective view of the keyboard and mouse support of FIG. 1;

FIG. 3 is a top plan view of the keyboard and mouse support of FIG. 1;

FIG. 4 is an end elevation view of a bottom piece of a keyboard support body;

FIG. 5 is a sectional view as seen from a plane indicated by the line 5—5 in FIG. 3;

FIG. 6 is a sectional view as seen from a plane indicated by the line 6—6 in FIG. 3;

FIG. 7 is a bottom plan view of a slidable mouse support;

FIG. 8 is a sectional view of the slidable mouse support as seen from a plane indicated by the line 8—8 in FIG. 7;

FIG. 9 is a sectional view of the keyboard and mouse support of FIG. 1;

FIG. 10 is a sectional view of a ball catch fastener used to affix a wrist support to a keyboard support body of the keyboard and mouse support body;

FIG. 11 is an exploded perspective view of a second preferred embodiment of a keyboard and mouse support of the present invention;

FIG. 16 is a top plan view of a bottom piece of the keyboard support body of the keyboard and mouse support of FIG. 11;

FIG. 17 is a sectional view of the bottom piece of the keyboard support body of FIG. 16 as seen from a plane indicated by the line 17—17 in FIG. 16;

FIG. 17A is an enlarged view of a portion of the bottom piece of the keyboard support body corresponding to the circled area in FIG. 17; and FIG. 18 is a bottom exploded perspective view showing the keyboard and mouse support of FIG. 11 secured to an adjustable support.

DETAILED DESCRIPTION

First Preferred Embodiment

Figures 1, 2:
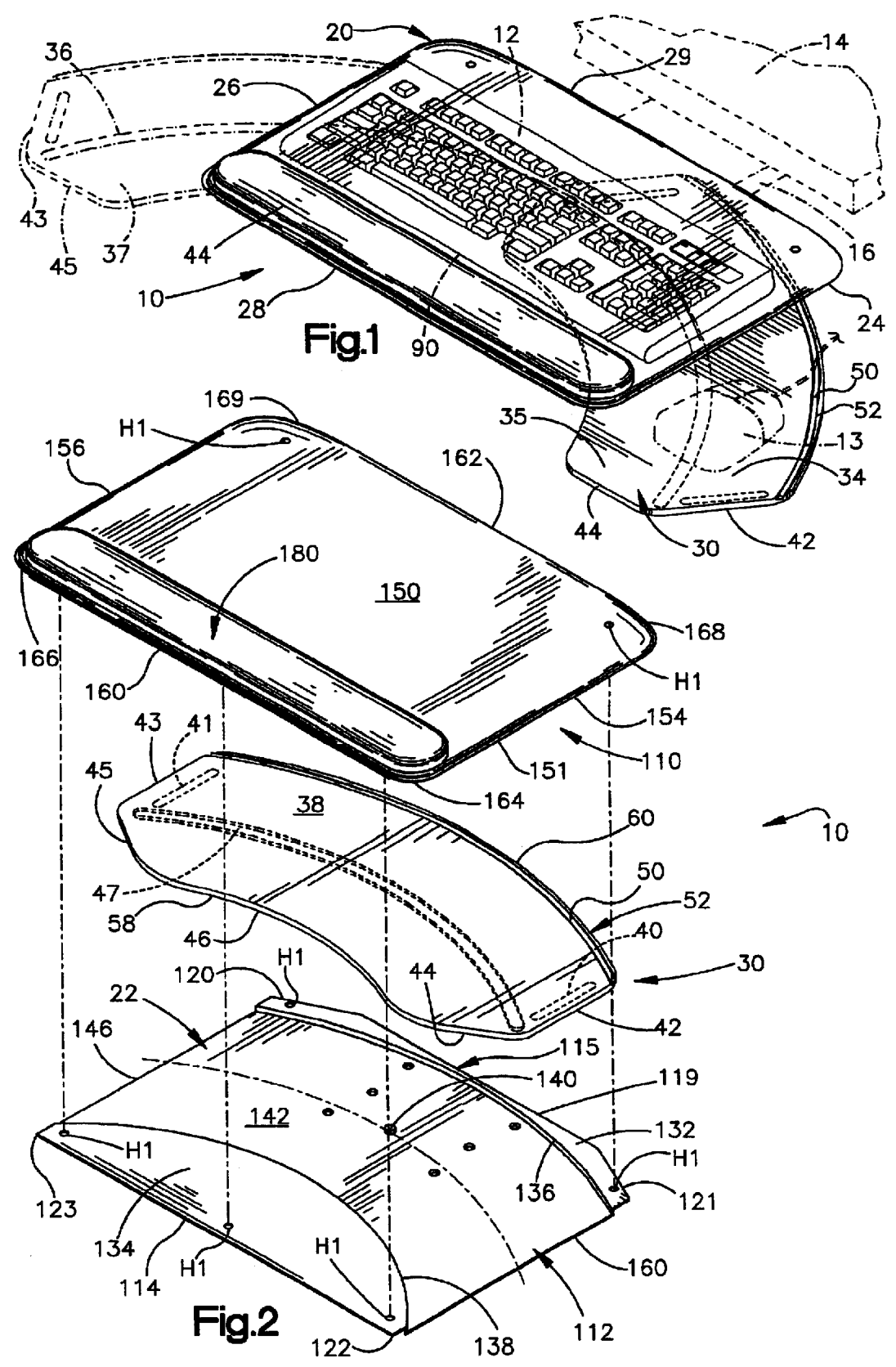
Figure 12:
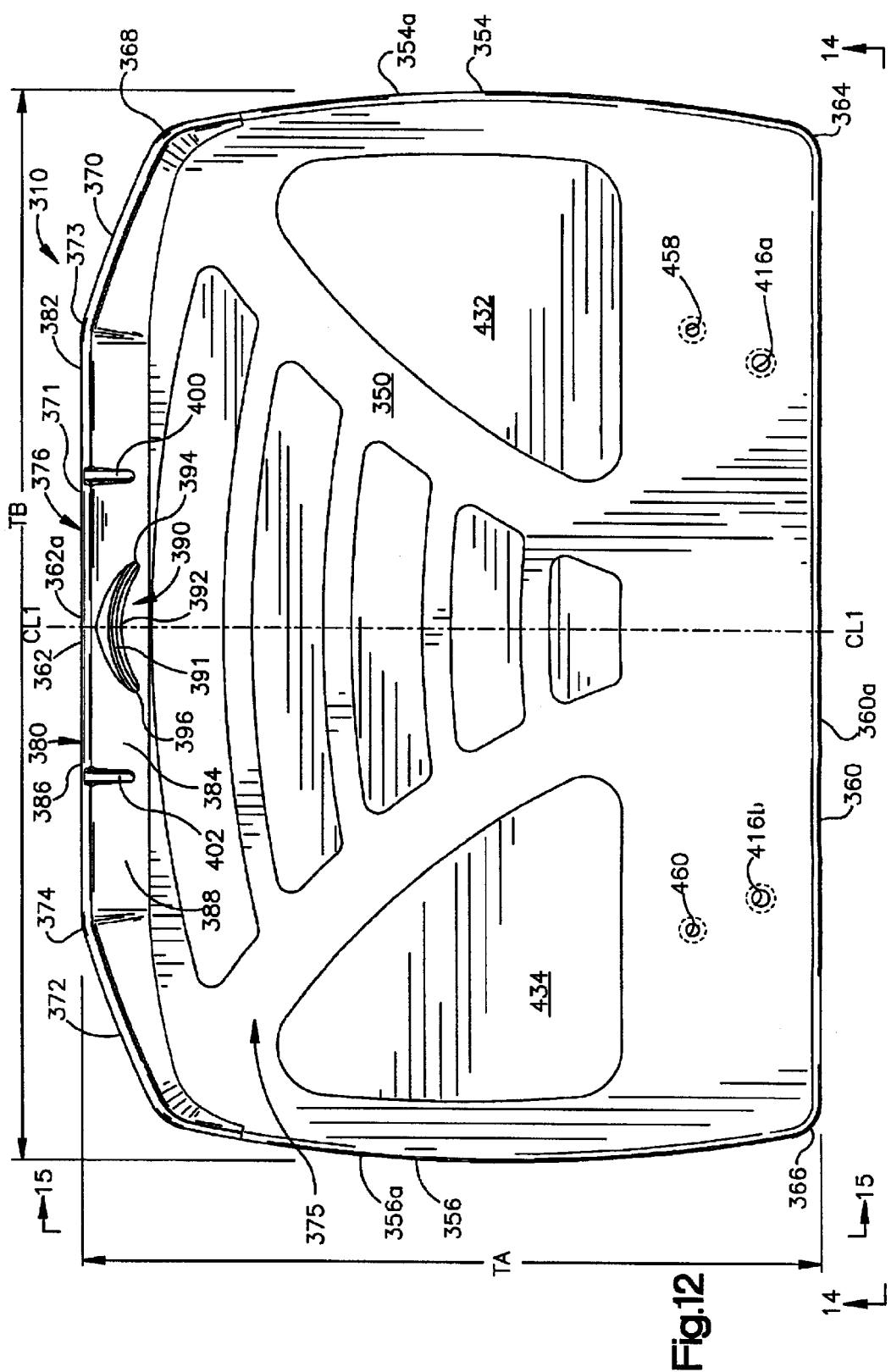
FIG. 12 is a top plan view of a top piece of a keyboard support body of the keyboard and mouse support of FIG. 11.

Turning now to the drawings, FIG. 1 is a perspective view of a first preferred embodiment of a keyboard and mouse support 10 of the present invention. The keyboard and mouse support 10 is used to support a keyboard 12 in position for typing and a moveable pointer input device or mouse 13 in a position for mouse controlled function selection and/or data entry. The keyboard 12 and mouse 13 are typically coupled to a computer or workstation (not shown) resting on a desk (shown in dashed line at 14) for providing a working surface for a user. The keyboard and mouse support 10 may be mounted to a base that includes a retractable arm (shown in dashed line at 16 in FIG. 1) that extends out from beneath the desk 14 and allows the user to adjustably position the keyboard 12 relative to the desk 14.

Overall Structure of Keyboard and Mouse Support 10

The keyboard and mouse support 10 includes a keyboard support body 20 having a cutout or throughpassage 22 (FIG. 2) that defines a track for a moveable mouse support 30. A top surface 150 of the keyboard support body 20 defines a support surface configured to accommodate the keyboard 12. The throughpassage 22 is a curved slot that extends through the keyboard support body 20. The mouse support 30 fits within a portion of the throughpassage 22 of the support body 20 and can be moved to extend outwardly to the right of the support body 20 to define a first mouse support surface 34 that includes a first region 35 (FIG. 1) in front of a front edge 42 of the keyboard 12 as the keyboard is resting on the keyboard support body 20. The mouse support 30 may also be slidably move to the left within the throughpassage 22 of the support body 20 such that a portion of the mouse support 30 extends outwardly to the left of the support body 20 to define a second mouse support surface 36 that includes a first region 37 (FIG. 7) in front of a front edge 42 of the keyboard 12 as the keyboard is resting on the keyboard support body 20.

A wrist support 180 extends above the supporting surface 32 and is attached the keyboard support body 20 adjacent a front edge 28 of the keyboard support body 20. The wrist support 180 contacts a user's wrist as the user types at the keyboard 12. As can best be seen in FIG. 9, the wrist support 180 is comprised of a resilient foam 182 confined within a plastic case or covering 183 and has a thin rigid metal or plastic base 184 with a pair of apertures.

Keyboard Support Body 20

As seen in the exploded perspective view of FIG. 2, the keyboard support body 20 is made up of top and bottom body pieces 110, 112 that mate with each other along an outer periphery of the support body 20. A top piece 110 is generally rectangular in plan view. A front or forward edge 160 (facing the user of the keyboard 12) extends between two rounded corners 164, 166 and a rear or rearward edge 162 (away from the user of the keyboard 12) of the top piece 110 extends between two rounded corners 168, 169. A distance D1 (FIG. 3) from the front edge 160 to the rear edge 162 of the keyboard support body top piece 110 is about 13 ¼ inches in one exemplary embodiment of the invention. The upper surface of the top piece 110 defines the upper support surface 150 of the keyboard support body 20.

The corresponding distance from a front edge 114 to a rear edge 115 of the keyboard support body bottom piece 112, labeled D2 in FIG. 3, is about 12 ⅞ inches. The width of the top piece 110 from the right edge 24 to the left edge 26 is approximately 20 inches (labeled as W1 in FIG. 3), while the width of the bottom piece 112 is approximately 17 ½ inches (labeled as W2 in FIG. 3). The radius of the rounded corners 164, 166, 168, 169 of the top piece 110 is preferably 1.25 inches.

As seen in the perspective view of FIG. 2, the bottom piece 112 also has two rounded corners 122, 123 forming the respective ends of the front edge 114. The rear edge 115 made up of three segments 119, 120, 121. Segment 119 is parallel with respect to the front edge 114, while segments 120 and 121 are angled slightly toward the front of the bottom piece 112. The bottom piece 112 defines the arcuate throughpassage or cutout 22 which accommodates back and forth movement of the mouse support 30. The throughpassage 22 is bounded by rear and front raised segments 132, 134 (FIG. 2). The rear raised segment or portion 132 has a curved edge 136 that extends in an arc from a left side of the bottom piece 112 to a right side of the bottom piece 112. The curved edge 136 is generally symmetric about a centerline coincident with the line 5—5 of FIG. 3 passing through the bottom piece 112. The forward raised segment or portion 134 defines a second edge 138 facing the rear curved edge 136.

The rear and front raised portions 132, 134 confine the mouse support 30 to arcuate movement along a curved path of travel within the throughpassage 22. The radius of curvature of the front curved edge 138 is about 11.9 inches and the radius of curvature of the rear curved edge is about 20.1 inches. The center of both the radii of curvature is approximately 7.625 inches forward of the front edge 114 of the bottom piece 112.

The wrist support 180 is affixed to the upper surface 150 of the top piece 110 via a pair of ball catch fasteners 172 (one of which is seen in cross section in FIG. 9). Respective stem portions 174 of the ball catch fasteners 172 are disposed in a pair of 0.3125 inch diameter holes in a rigid fiberboard base 184 of the wrist support 180 and are held in place by friction. The ball portions 176 of the ball catch fasteners 172 extend through aligned holes 170 in the keyboard support body top piece 110. Since the ball portions 176 of the ball catch fasteners 172 are of greater diameter than the aligned holes in the top piece 110 (0.350 inch versus 0.3125 inch), the ball portions 176 are compressed and the wrist support 180 and top piece 110 are fixedly attached via frictional force between the compressed ball portions 176 and the top piece 110 and between the compressed stem portions 174 and the wrist support fiberboard base 184. Two aligned holes providing for clearance are also provided in the bottom piece 112 given that the compression of the ball portions within their respective top piece holes 170 elongates the ball portions slightly. A suitable ball catch fastener 170 is Part No. 320-322880-03 Mini Ball Tree-Lok fastener manufactured by ITW Fastex, 195 Algonquin Road, Des Plaines, Ill. 60016. The two holes 170 in the top body piece 110 are spaced approximately 9.5 inches apart.

In accordance with an exemplary embodiment of the invention, the top keyboard support piece 110 and the mouse support 30 are machined composite plastic (paper based phenolic) members, preferably ¼ inch thick. The paper base material is impregnated with phenolic resin and then cured to make the rigid top piece 110 and the mouse support 30. The bottom keyboard support piece 112 is a metal (steel) stamping having a thickness of about 0.073 inches. The metal stamping is deburred and painted prior to assembly of the keyboard and mouse support 10. Of course, those skilled in the art will recognize that the top piece, mouse support and bottom piece may be suitably fabricated of various other materials including wood, fiberboard, plastics such as polypropylene and ABS, sheet molded materials, etc.

A bottom surface 151 of the top piece 110 rests against the raised portions 132, 134 of the bottom piece 112. Connectors (not shown) pass through five aligned holes H1 in the two pieces 110, 112 to attach the two pieces together after the mouse support 30 has been positioned within the throughpassage 22. Suitable connectors include #10×32 ⅜ inch long flat Phillips head screws which thread into suitable steel nut inserts press fit into the holes H1. The holes H1 in the top piece 110 are 5 millimeters in diameter and are countersunk adjacent the upper surface 150 to 0.375 inch diameter. The three holes H1 near the front edge 160 of the top piece 110 are spaced apart 8 inches and the two outer two holes are 2 inches from the right and left sides 154, 156 of the top piece 110. The two holes H1 near the back edge 162 are spaced apart 11.5 inches and are 4.25 inches from the sides 154, 156.

As seen in the perspective view of FIG. 2, a pin 140 extends upwardly from a generally planar surface 142 of the curved throughpassage 22. The pin 140 forms a stop that limits the extent of movement of the mouse support 30 as will be explained below.

As is best seen in FIG. 9, the bottom surface 151 of the top piece 110 includes an arcuate rectangular groove or recess 152 to provide clearance for an elongated bead 50 extending upwardly from the mouse support 30. The elongated bead 50 will be described below. Preferably, the recess 152 is ½ inch wide and 5/32 inch in depth. The recess 152 is arcuate and aligned with the mouse support capture bead 50.

Edges of the top piece 110 and the mouse support 30 are exposed to contact by the user. As seen in the section view of FIG. 6, the top piece 110 and the mouse support 30 have rounded or contoured edges 110a, 30a respectively that extend around an outer periphery of those members.

Mouse Support 30

The mouse support 30 is an arcuate board-like member with front and back arcuate edges 58, 60 of the mouse support 30 having substantially the same radius of curvature as the curved edges 138, 136 defining the throughpassage 22 so that it fits within the curved slot defined by the throughpassage 22. The radius of curvature of the front edge 58 of the mouse support 30 is slightly larger than the radius of curvature of the edge 138 and the radius of curvature of the back edge 60 of the mouse support 30 is slightly smaller than the radius of curvature of the edge 136 to allow for clearance. The center of all four radii of curvature is substantially identical, being located approximately 7.625 inches forward of a front edge 139 of the bottom piece 112.

The mouse support 30 includes an upper surface 38 and a lower surface 46 (FIGS. 2 and 8). A position of the mouse support 30 relative the keyboard support body 20 is adjusted by pushing the mouse support 30 back and forth through the slot-shaped throughpassage 22. The mouse support 30 can be extended by the user to a position beyond one or the other side of the keyboard support body 20 so that the curve of the arcuate mouse support body 30 positions work regions 34, 36 defined by the mouse support 30 to either the left and forward of the keyboard 12 (region 37 in FIG. 7) or to the right and forward of the keyboard 12 (region 35 in FIG. 7).

As is shown in solid line in FIG. 1, in a first position, the mouse support 30 is moved to the right, as seen from a perspective of a user of the keyboard 12, the first mouse support work region 34 is defined adjacent right end portions 42, 44 of the mouse support 30. Particularly, a portion of the first mouse support work region 34 includes a first extending region 35 that extends forward of the keyboard front edge 90 and is adjacent the right end portion 44 when the mouse support 30 is in the first position. As is shown in dashed line in FIG. 1, in a second position, the mouse support 30 is moved to the left, as seen from a perspective of a user of the keyboard 12, the second mouse support work region 36 is defined adjacent left end portions 43, 45 of the mouse support 30. Particularly, a portion of the first mouse support work region 36 includes a second extending region 37 that extends forward of the keyboard front edge 90 and is adjacent the right end portion 45 when the mouse support 30 is in the second position. As is shown in FIG. 3, when in an intermediate or middle position, the mouse support 30 is hidden from view within the throughpassage 22 of the keyboard support body 20.

As is best seen in FIG. 7, a bottom surface 46 of the mouse support 30 defines an arcuate slot 47 that extends upwardly into the mouse support body. When the top and bottom body pieces 110, 112 of the keyboard support body 20 are assembled, the pin 140 extends into the slot 47 as seen in the section view of FIG. 5. When the user pulls the mouse support 30 out from the keyboard support body 20, the user is able to move the mouse support 30 until the pin 140 butts against either a right end 48 or a left end 49 of the slot 47. In the configuration shown in solid line in FIG. 1, with the mouse support extending beyond the right hand side 24 of the keyboard support body 20., the stop pin 140 butts against a right end 48 of the slot 47 and with the mouse support 30 extending from the left hand side of the keyboard support body 20, the pin 140 butts against the left end 49 of the slot 47.

As mentioned above, the bottom piece 112 of the support body 20 has a width W of about 17 ½ inches from the right edge 144 to the left edge 146. This is shorter than the width of the top piece 110 (about 20 inches) and allows the user to reach under the keyboard support 20 and grasp the mouse support 30. In order to allow the user to more easily grasp the mouse support 30, the mouse support 30 defines two notches 40, 41 along two oppositely facing generally straight edge portions 42, 43 (FIG. 2) of the mouse support 30. As seen in the plan view of FIG. 3, the straight edge portions 42, 43 generally align with opposite sides 24, 26 of the keyboard support body 20 with the mouse support 30 in its hidden middle position. As seen in the perspective view of FIG. 1, beveled or angled edge portions 44, 45 of the mouse support 30 extend generally parallel to the front edge 90 of the keyboard 12 and also extend in front of the front edge 28 of keyboard support body 20.

Advantageously, the mouse support 30 includes the upwardly protruding elongated mouse capture bead 50 that extends along a back or rear edge 60 of the mouse support 30. The bead 50 is arcuate, a center line of the bead 50 having a radius of curvature of approximately 19.75 inches and a center of the radius of curvature corresponding to the center of the radii of curvatures of the rear and front curved surfaces 136, 138 and the front and back edges 58, 60 of the mouse support 50. A center line of the arcuate bead 50 is offset inwardly from the back edge 60 of the mouse support about 0.1875 (3/16) inch, labeled as OS in FIG. 8.

The bead 50 prevents the mouse 13 when placed on either of the two mouse support work regions 34, 36 from sliding off the back edge 60 of the mouse support 30. If the keyboard and mouse support 10 is adjusted to a negative angle, the mouse would tend to roll off the back of the mouse support 30 if no upwardly protruding member such as the bead 50 were disposed along the back edge 60 of the mouse support 30. A negative angle of the mouse and keyboard support 10 is one in which the front edge 28 (the edge facing toward the user) of the keyboard support body 20 is at a higher vertical position than the back edge 29 (the edge facing away from the user) of the keyboard support body 20.

Preferably, the bead 50 is generally cylindrical in shape. One suitable flexible material for the bead 50 is 0.020 inch diameter Buna-N O-ring cord. However, it should be understood that other materials such as rigid plastic materials formed with the appropriate arcuate shape and size are also suitable for the bead 50. The material selected for the bead 50 should have a relatively high coefficient of friction to prevent the mouse 13 from "jumping" over the bead 50 when the support 10 is adjusted to a negative angle while still maintaining a low profile for the bead 50, that is, minimizing the distance that the bead 50 must extend above the upper surface 150 to keep the mouse 13 "captured" in the right and left mouse support work regions 34, 36. As can best be seen in FIG. 8, the bead 50 is seated in an arcuate recess or groove 52 in the planar upper surface 38 of the mouse support 30. The recess 52 is preferably a ¼ inch diameter semicircle formed with an appropriate router bit. The bead 50 may be affixed by adhesive 54 disposed between the portion of the mouse support defining the recess 60 and the bead 50. An upper portion 52 of the bead 50 extends above the upper surface 38 of the mouse support 30. One suitable adhesive 54 is cyanoacrylate. Other adhesives such as PSA tape, hot melts, or solvent based adhesives known to those skilled in the art may also be suitably employed. As can be seen in FIG. 9, clearance for the upper portion 52 of the bead 50 is provided by the recess 152 in the lower surface 150 of the top piece 110.

Second Preferred Embodiment

FIGS. 11–17 depict a second preferred embodiment of a keyboard and mouse support of the present invention, shown generally at 210 in FIGS. 11 and 18. The keyboard and mouse support 210 is similar to the keyboard and mouse support 10 of the first embodiment in function. That is, the keyboard and mouse support 210 includes a keyboard support body 220 comprising an upper piece or body 310 and a bottom piece or body 312 affixed together to define an arcuate throughpassage 530. The keyboard support body 220 includes a top surface 350 which defines a support surface configured to accommodate a keyboard (not shown). Like the first embodiment, the keyboard and mouse support 210 further includes a mouse support 230 slideable within the arcuate throughpassage 530 extending through the keyboard support body 220.

As was the case in the first embodiment, the mouse support 230 can be extended by the user to a position beyond right and left edges 354, 356 of the keyboard support body 220 so that the curve of the arcuate mouse support body 230 positions work regions 234, 236 defined by the mouse support 230 to either the left and forward of the keyboard or to the right and forward of the keyboard. The right and left edges 354, 356 are defined by right and left sides 354a, 356a of the keyboard support body 220. Further, at least portions 235, 237 of the work regions 234, 236 extend in front of outwardly extending portions of a vertical plane (schematically shown as P—P in FIG. 11) coincident with a straight portion of a front edge 360 (defined by front side 360a) of the keyboard support body 220 and no portions of the throughpassage 222 of the keyboard support body 220 extends in front of the vertical plane P—P. The front edge 360 is defined by a front side 360a of the keyboard support body 220 When in an intermediate or middle position, the mouse support 230 is hidden from view within the throughpassage 530 of the keyboard support body 220.

For sake of brevity, features of the keyboard and mouse supports of the first and second embodiments 10, 210 that are similar will not be described again. Particularly, the mouse support 230 is substantially identical to the mouse support 30 of the first embodiment.

Keyboard Support Body 220

As seen in the exploded perspective view of FIG. 2, the keyboard support body 220 is comprised of top and bottom bodies or pieces 310, 312 that are mechanically fastened together. The primary difference between the keyboard and mouse support 210 and the keyboard and mouse support 10 is the structure and composition of the top piece or body 310 of the keyboard support body 220. Advantageously, the upper piece 310 of the keyboard support body 220 is fabricated injection molding of a durable plastic as opposed to machining a plastic composition (paper based phenolic resin) as was the case with the upper piece 110 of the first embodiment. Fabricating the upper piece 310 of the keyboard support body 220 via plastic injection molding results in a durable, yet lightweight upper piece 210 which is less expensive both from a material cost and a labor cost perspective when produced in large quantities. Additionally, the upper piece 310 includes several features for improved user efficiency and a neater workstation layout as will be described below.

Top Piece 310

The top piece 310 is generally rectangular in plan view and, preferably, is fabricated from plastic using injection molding. The plastic may be any type of durable, lightweight plastic and in one exemplary embodiment is polystyrene (polymerized styrene, a thermoplastic synthetic resin). Polystyrene is characterized by high strength and impact resistance, excellent electrical and thermal insulation properties and is easily colored, molded and fabricated. The top piece is symmetric with respect to the center line CL1.

The front or forward edge 360 (facing the user of the keyboard) of the keyboard support body 220 is defined by the front side 360a of the support body 220 which corresponds to a front side of the top piece 310. The front edge 360 extends between two rounded corners 364, 366. A back edge 362 (facing away from the user of the keyboard) of the keyboard support body 220 is defined by the back side 362a of the support body 220 which corresponds to a rear side of the top piece 310.

The back edge 362 extends between two rounded corners 368, 369. As can best be seen in FIG. 12, the back side 362a of the top piece 312 includes three generally linear portions 370, 371, 372. A curved section 373 of the rear side 362a transitions between linear portion 370 and the longest linear portion 371 and a curved section 374 transitions between the longest linear portion 371 and the linear portion 372.

The top piece 310 includes two portions, a generally planar portion 375 (FIG. 11) corresponding to the support surface 350 and a raised portion 376 extending forwardly from the back or rear side 362a which defines a back wall 380. As can best be seen in FIGS. 11 and 14, the back wall 380 is highest in the longest linear portion 371 and tapers downwardly toward the support surface 350 in the linear portions 370, 372. The back wall 380 extends around the corners 368, 369 and extends slightly along right and left sides 354a, 356a. The back wall 380 includes a generally vertical surface 382 which corresponds to the back side 362a, a curved surface 384 which angles upwardly from the support surface 350, and a rounded top surface 386 which transitions between the rearward facing vertical surface 382 and the forward facing curved surface 384.

Formed in the curved surface 384 of the back wall 380 is an arcuate opening or slot 390 which advantageously functions as single or multiple page document holder. The document holder slot 390 permits the user of the keyboard to position one or more document pages directly in front of the user just below the user's line of sight to a computer monitor (part of computer workstation-not shown) supported by the desk upper surface. The document holder slot 390 advantageously permits a user to quickly and easily look at a document the user needs to refer to or copy from during a work session, e.g., a marked up hard copy of a draft that the user is revising on the computer. The position of the document in front of the user precludes the need for the user to turn his or her head to the side to view a document placed on the desk upper surface or next to the keyboard. Additionally, moving documents being viewed by the user from the desk top to the document holder slot 390 makes the desk and workstation neater and frees up additional desk space.

The document holder slot 390 is generally V-shaped in cross section (FIG. 13A) and is curved or arcuate when viewed in plan view (see FIG. 12). The slot 390 includes a bottom or vertex 391 that is generally horizontal, that is, parallel with the support surface 350 or the planar surface portion 375. The slot 390 has its greatest is depth (approximately 0.56 inch) in a middle section 392 of the slot and becomes shallower in depth moving toward either end 394, 396 of the slot because of the combination of the arcuate shape of the slot and the downward slope of the upper surface 388 of the back wall 380.

A bottom edge of a piece of paper is inserted in the slot 390 by a user of the keyboard. Since the bottom 391 of the slot 390 is horizontal, the paper will be properly aligned for reading text by the user, that is, horizontal lines of text will indeed be horizontal when view by the user instead of being angled. Further, since the slot 390 is arcuate in plan view, the bottom edge of the piece of paper will be slightly curved which tends to stiffen or stabilize the paper and cause it to be held upright as opposed to folding over on itself. Since the slot 390 is V-shaped, the paper is held at a slight angle away from the user thereby providing additional distance between the user's eye and the paper and thereby reducing eye strain associated with reading a document positioned too close to the eye. Finally, the width of the slot (approximately 0.25 inch wide at an upper opening of the middle section 392) permits multiple page documents to be readily held upright in the slot 390.

Advantageously, the back wall 380 of the top piece 310 additionally includes two additional passages or slots 400, 402 extending through the back wall 380 from the front curved surface 384 through the back vertical surface 382. The slots 400, 402 permit a cord extending rearwardly from the keyboard to be secured and routed through a selected one of the slots 400, 402 away from the user. As can best be seen in FIG. 14, the slots 400, 402 are generally U-shaped in cross-section and have an upper opening of about 0.25 inch. The angled shape of the slots 400, 402 facilitates insertion of the cord into a selected one of the slots 400, 402 by the user and additionally facilitates the cord being firmly held by the selected slot once inserted by the user.

The corner 368 defining the transition between the right side 354a and the back side 362a of the top piece 312 includes an angled slot 404 (FIG. 11) which advantageously functions to secure and route a mouse cord rearwardly away from the user. The mouse cord slot 404 is generally U-shaped in cross section and is angled at about 45 degrees with respect the front side 360a of the top piece 310. The slot 404 will be used by right handed mouse users, that is, users who extend the mouse support 230 to the right of the keyboard support 220. Similarly, the corner 369 defining the transition between the left side 356a and the back side 362a of the top piece 312 includes an angled slot 406 (FIG. 15) which advantageously functions to secure and route a mouse cord rearwardly away from the user The mouse cord slot 406 is generally U-shaped in cross section and is angled at about 45 degrees with respect to the front side 360a of the top piece 310. The slot 406 will be used by left handed mouse users, that is, users who extend the mouse support 230 to the left of the keyboard support 220.

The keyboard cord slots 400, 402 and the mouse cord slots 404, 406 both function to increase user efficiency by routing away from the user cords that otherwise may become entangled with other objects either above or below the desk surface. Additionally, the slots tend to further secure the mouse and the keyboard thereby reducing the possibility of damage to the mouse or keyboard resulting from the user accidentally bumping or knocking the mouse or keyboard off of its support and onto the floor.

A wrist support 410 is affixed to the upper surface 350 of the top piece 310 via a pair of ball catch fasteners 412a, 412b (seen in dashed line in FIG. 11). Respective stem portions of the ball catch fasteners 412a, 412b are disposed in a pair of 0.3125 inch diameter holes in a rigid fiberboard base 414 of the wrist support 410 and are held in place by friction. The ball portions of the ball catch fasteners 412a, 412b extend through aligned holes 416a, 416b in the keyboard support body top piece 310. Since the ball portions of the ball catch fasteners 412a, 412b are of greater diameter than the aligned holes 416a, 416b in the top piece 310 (0.350 inch versus 0.3125 inch), the ball portions are compressed and the wrist support 410 and top piece 310 are fixedly attached via frictional force between the compressed ball portions and the top piece 310 and between the compressed stem portions and the wrist support fiberboard base 414. A suitable ball catch fastener is Part No. 320-322880-03 Mini Ball Tree-Lok fastener manufactured by ITW Fastex, 195 Algonquin Road, Des Plaines, Ill. 60016. The two holes 416a, 416b in the top body piece 310 are spaced approximately 9.5 inches apart.

The upper surface 350 of the top piece 350 additionally including a pair of pads 420, 422. The pads 420, 422 are comprised of a non-slip material that is also provides a cushioning effect. The pads 420, 422 advantageously function to inhibit rearward sliding of the keyboard during use. In one exemplary embodiment, the pads 420, 422 are generally triangular in shape and include a tacky, striated, non-slip upper surface 424, 426 and a resilient foam body 428, 430. Preferably, the pads 420, 422 comprise neoprene foam with a non-skid natural rubber coating. The pads 420, 422 are attached to the support surface 350 via adhesive, particularly, the pads are disposed in respective recessed portions 432, 434 of the support surface 350. It should be recognized, of course, that the pads 420, 422 could be configured as a single piece of non-slip material, a plurality of strips of non-slip material, etc.

Figure 13:
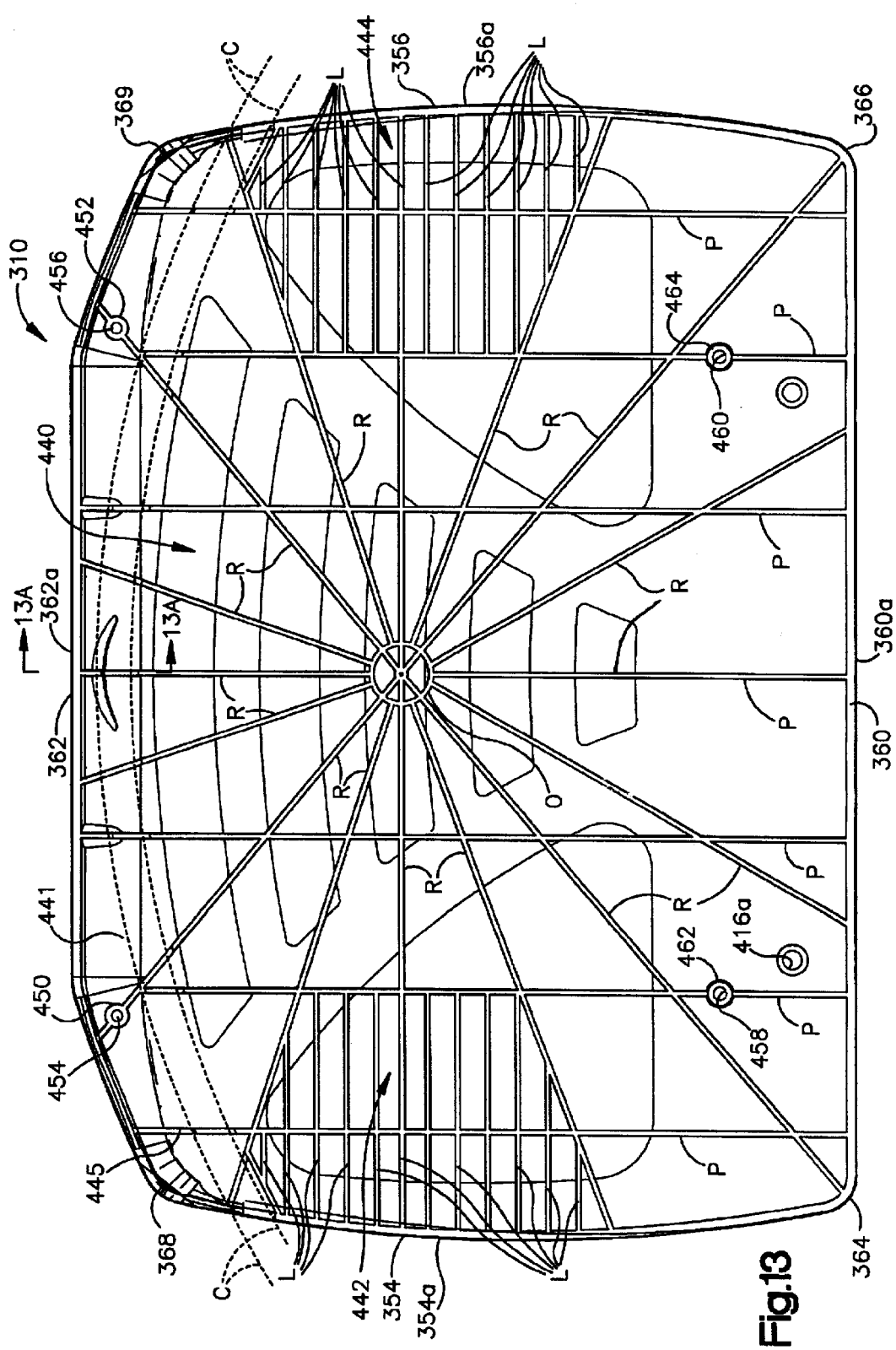
FIG. 13 is a bottom plan view of the top piece of the keyboard support body of FIG. 12.
Figure 13A:
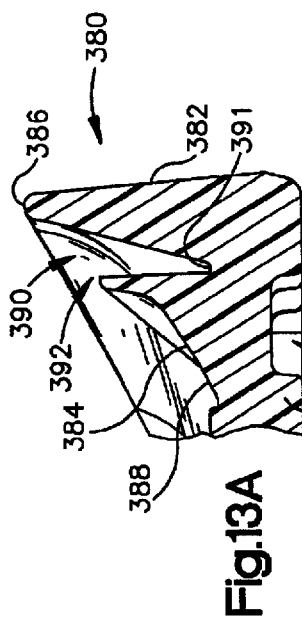
FIG. 13A is a sectional view of a document holder slot of the top piece of the keyboard support body of FIG. 12 as seen from a plane indicated by the line 13A—13A in FIG. 13.
Figure 14:
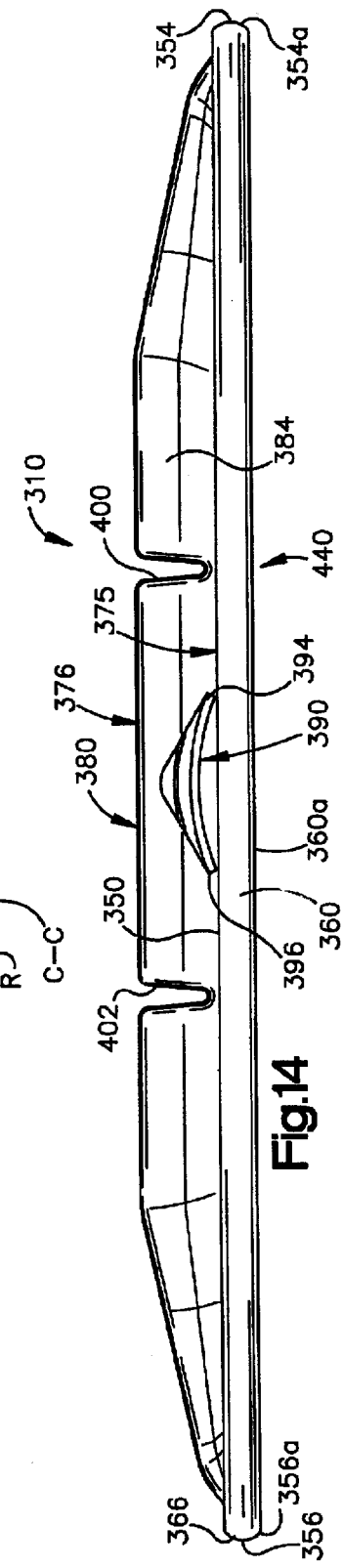
FIG. 14 is a front elevation view of the top piece of the keyboard support body of FIG. 12 as seen from a plane indicated by the line 14—14 in FIG. 12.
Figure 15:
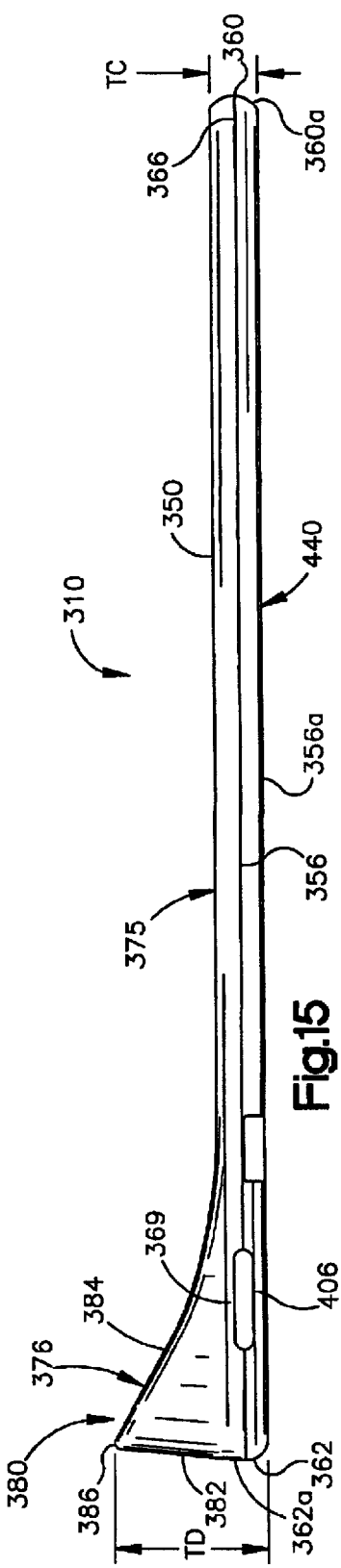
FIG. 15 is a side elevation view of the top piece of the keyboard support body of FIG. 12 as seen from a plane indicated by the line 15—15 in FIG. 12.

FIG. 13 shows a bottom plan view of the injection molded top piece 312. As can be seen, the bottom surface 440 includes a plurality of spaced apart support ribs extending downwardly (as seen from the viewpoint of the user) from a planar surface 441. The ribs include 24 longitudinal ribs L (that is, parallel to front side 360a), seven ribs P which are perpendicular to the longitudinal ribs (that is, orthogonal to the front side 360a) and 16 ribs R which extend radially outward from a central origin O. In conformity with standard injection molding practice, the liquid plastic is injected into the mold in the region of the origin O and then spreads outwardly along paths defining the radial ribs R. The perpendicular ribs P add strength and stability so that the support surface 350 does not exhibit excessive deflection or twisting during use. The height of the top piece support surface 350 is approximately 0.160 inch. A height of the ribs is approximately 0.285 inch for an overall total height of 0.445 inch. Each rib R, P, L is about 0.090 inch thick.

The longitudinal ribs L are closely spaced in the regions 442, 444. This close spacing of the ribs L functions as an impedance to prevent the user from getting his fingers pinched between right or left sides 354a, 356a of the top piece 30 and the mouse support 330 when reaching under the top piece 310 to slide the mouse support 330 to a desired position. The finger impedance regions 442, 444 generally correspond to cut-out regions 542a, 542b of the bottom piece 312, discussed below.

As was the case in the first preferred embodiment the mouse support 230 includes an elongated mouse capture bead 250 that is disposed in a groove in an upper surface 238 of the mouse support 230 adjacent a back or rear edge 260. To provide clearance for the mouse capture bead 250, portions of ribs along the path labeled C—C are recessed upwardly about 0.09 inch from a lowest downwardly extending portion 445 of the ribs.

In one exemplary embodiment of the top piece 310 of the keyboard support, the top piece 310 includes the following approximate dimensions:

| Description | Label | Figure | Dimension |
| --- | --- | --- | --- |
| Overall length | TA | 12 | 13.25 inches |
| Overall width | TB | 12 | 20.00 inches |
| Radius of curvature of corners 364, 366, 368, 369 | | 12 | 1.25 inches |
| Overall height of support surface portion | TC | 15 | 0.445 inch |
| Height of ribs | | | 0.285 inch |
| Height of planar portion | | | 0.160 inch |
| Max. height of back wall portion | TD | 15 | 1.42 inches |

Bottom Piece 312

The bottom piece 312 is preferably fabricated by stamping of cold rolled steel. In one exemplary embodiment, the steel has a thickness of 0.059 inches. The bottom piece is symmetric about the center line CL2. As can best be seen in FIG. 16, a triangular shaped cutout 500 is removed from the bottom piece 312 during fabrication to maintain flatness and dimensional stability of the bottom piece The bottom piece 312 includes a linear front side or edge 514, a back side or edge 515, a generally curved right side or edge 516 and a generally curved left side or edge 517. Rounded corners 522, 523 form respective ends of the front side 314 and rounded corners 524, 525 form respective ends of the back side 515, The rounded corners 522, 523 preferably have a radius of curvature of 0.25 inch and the rounded corners 524, 525 preferably have a radius of curvature of 1.00 inch.

The bottom piece 312 defines the arcuate throughpassage or cutout 530 which accommodates back and forth movement of the mouse support 230. The throughpassage 530 is bounded by rear and front raised portions or segments 532, 534 (FIGS. 11 and 16). Along its forward periphery, the rear raised portion 532 defines a vertically oriented curved edge or wall 536 that extends in an arc from the left side of the bottom piece 512 to a right side of the bottom piece 512. The curved wall 536 is generally symmetric about the center line CL2 (FIG. 16). Along its rearward periphery, the forward raised segment or portion 534 defines a vertically oriented curved edge or wall 538 facing the rear curved wall 536. A generally planar upper surface 539 extends between the front and rear curved walls 538, 536.

The rear and front raised portions 532, 534 and, particularly, the front and rear curved walls 538, 536 confine the mouse support 230 to arcuate movement along a curved path of travel within the throughpassage 530. The radius of curvature of the front curved edge 538 is about 11.9 inches and the radius of curvature of the rear curved edge 536 is about 20.1 inches. A radial distance between the two curved edges 536, 538 is about 8.2 inches and is constant along the entire lengths the curved edges 536, 538. The center of both the radii of curvature is approximately 8.934 inches forward of the front edge 514 of the bottom piece 312.

Extending rearwardly from the right front corner 522 is a short linear section 540a of the right side 516 which terminates in a corner 541a having a radius of 0.38 inch. The corner 541a transitions into a generally U-shaped cutout region 542a. Moving from front to rear, the U-shaped cutout region 542a is comprised of a convex section 543a having a radius of 12.65 inches, a concave section 544a having a radius of 2.00 inches, a linear section 545a, and terminating in a concave section 546a having a radius of 2.00 inches. The U-shaped cutout region 542a transitions into a corner 547a having a radius of 0.038 inch. Extending rearwardly from the corner 547a is a linear section 548a which transitions into the right rear corner 524, ending the right side 516.

Similarly, extending rearwardly from the left front corner 523 is a short linear section 540b of the left side 517 which terminates in a corner 541b having a radius of 0.38 inch. The corner 541b transitions into a generally U-shaped cutout region 542b. Moving from front to rear, the U-shaped cutout region 542b is comprised of a convex section 543b having a radius of 12.65 inches, a concave section 544b having a radius of 2.00 inches, a linear section 545b, and terminating in a concave section 546b having a radius of 2.00 inches. The U-shaped cutout region 542b transitions into a corner 547b having a radius of 0.038 inch. Extending rearwardly from the corner 547b is a linear section 548b which transitions into the left rear corner 525, ending the left side 517.

The back or rear side 515 of the bottom piece 312 comprises three segments 550, 552, 554. Segment 552 is parallel with respect to the front side 514, while segments 550 and 552 are angled slightly toward the front side 514 of the bottom piece 312. In one exemplary embodiment the angle is a 20 degree angle.

The U-shaped cut out regions 542a, 542b provide for clearance so the user can easily grasp one of the mouse support notches 240, 241 recessed near opposite ends 242, 243 of a bottom surface 246 of the mouse support 230. The cut out regions 542a, 542b also advantageously reduce the weight of the bottom piece 312. Moreover, the front edge 514 of the bottom piece 312 does not extend to the front edge 360 of the top piece 310, the right edge 516 of the bottom piece 312 does not extend to the right edge 354 of the top piece 310, and the left edge 517 of the bottom piece 312 does not extend to the left edge 356 of the top piece 310, thereby reducing material cost of the bottom piece 310 and the weight of the bottom piece 312.

The bottom surface 246 of the mouse support 230 slides within the throughpassage 530 defined by the lower surface 440 of the top piece 310, the vertically oriented rear and front curved walls 536, 538 and the planar upper surface 539 extending between the two walls 536, 538. Positioned along the center line CL2 and rearwardly approximately 7.05 inches from the front edge 514 is a circular opening (0.75 inch diameter) in the bottom piece 312. Press fit into the circular opening is a stand-off fastener having a hexagonal base 560. Extending upwardly from the stand off fastener hexagonal base 560 is a pin 562. The pin 562 extends uppwardly from the base approximately 0.0185 inch. Since an upper surface of the hexagonal base 560 is recessed 0.025 inch below the planar upper surface 539 of the bottom piece 312, the pin 562 extends upwardly 0.160 above the planar upper surface 539. The pin 562 interfits in the mouse support slot 247 as described in the first preferred embodiment to limit sliding movement of the mouse support 230 with respect to the keyboard support body 220

In one exemplary embodiment of the top piece 310 of the keyboard support, the top piece 310 includes the following approximate dimensions.

| Description | Label | Figure | Dimension |
|---|---|---|---|
| Overall length | B1 | 16 | 11.57 inches |
| Overall width | B2 | 16 | 15.50 inches |
| Height of raised portions 532, 534 above planar surface 539 | B3 | 17 | 0.275 inch |

Attachment of Top and Bottom Pieces 310, 312

The bottom surface 440 of the top piece 310 rests against the raised portions 532, 534 of the bottom piece 312. Four connectors mechanically secure the top and bottom pieces 310, 312. Suitable connectors include two #10×32 ½ inch long flat Phillips panhead machine screws and two #48-2× 10-4×½ inch Plastite® Phillips panhead screws.

The top piece bottom surface 440 includes rounded bosses 450, 452 (FIG. 13) defining two threaded openings 454, 456 approximately 11.5 inches apart. The openings are just slightly forward of the back side 352a of the top piece 312. The bottom piece 310 includes two aligned openings 570, 572 (FIG. 16) approximately 1.57 inches forward of the section 552 of the back side 515 and approximately 10.0 inches rearward of the front side 514. The pair of Phillips panhead machine screws (not shown) installed from the bottom side extend through the openings 570, 572 and thread into threaded openings 454, 456

The top piece 310 additionally includes two countersunk openings 458, 460 (FIGS. 12 and 13), approximately 10.656 inches apart, extending through the upper support surface 350 and through round bosses 462, 464 (FIG. 13) of the bottom surface 440. The bottom piece 312 includes two openings 574, 576, preferably 0.25 inch diameter. Threaded steel nut inserts 580, 582 (FIG. 16) are press fit into the openings 574, 576. The pair of Plastite® Phillips panhead screws (not shown) installed from the top side extend through the top piece countersunk openings 458, 460 and thread into threaded openings of the threaded steel nut inserts 580, 582. The heads of the screws fit into the countersunk openings and are seated below the generally planar surface defined by the top piece support surface 350 and therefore do not interfere with the seating of the wrist support fiberboard piece 414 on the top piece support surface 350. The four connectors mechanically affix the top and bottom pieces 310, 312.

Preferably, the keyboard and mouse support 210 is secured to a adjustable support structure 600 which, in turn, is secured to the underside of the desk holding the computer workstation monitor. This can best be seen in FIG. 18. The bottom piece 312 includes four openings 584, 586, 588, 590 defining a rectangle, being spaced approximately 5.25 inches apart horizontally and 4.00 inches apart vertically. The forwardly facing openings 584, 586 are approximately 7.05 inches reaward of the front edge 514 of the bottom piece 312. As can best be seen in FIG. 18, four threaded studs 592, 594, 596, 598 are secured in the openings 584, 586, 588, 590. Preferably, the studs 592, 594, 596, 598 are #10×32 ⅜ inch long threaded press-in studs. Such press-in studs are available from PEM or Captive Fastening Systems. Four #10-32 Keps nuts 602, 604, 606, 608 secure the keyboard and mouse support 210 to the adjustable support 600.

While the present invention has been described with a degree of particularity, it is the intent that the invention include all modifications and alterations from the disclosed design falling with the spirit or scope of the appended claims.

I claim:

1. A computer keyboard and mouse support comprising:
   a) a keyboard support having an upper support surface for supporting a computer keyboard and that defines a throughpassage extending between a left side and a right side of the keyboard support for slidably receiving a mouse support;
   b) the mouse support including first and second mouse support surfaces adjacent opposite ends of the mouse support, the mouse support being sized to slide within the keyboard support throughpassage between first and second positions, in the first position of the mouse support the first mouse support surface extending outwardly beyond the left side of the keyboard support and in the second position of the mouse support the second mouse support surface extending outwardly beyond the right side of the keyboard support; and
   c) wherein the keyboard support includes a back side and a document holder is formed in an upper surface of the keyboard support near the back side of the keyboard support.

2. The computer keyboard and mouse support of claim 1 wherein a back wall portion extends forwardly along at least a portion of the back side of the keyboard support and the document holder comprises a slot in the an upper surface of the back wall portion.

3. The computer keyboard and mouse support of claim 2 wherein the document holder slot is arcuate when viewed in plan view, the slot being wider in a middle portion and narrower adjacent ends of the slot.

4. The computer keyboard and mouse support of claim 2 wherein the back wall portion includes the back side of the keyboard support, a front side extending upwardly at an angle from the upper support surface and a middle section bridging the back and front sides of the back wall portion.

5. The computer keyboard and mouse support of claim 4 wherein the front side of the back wall portion is arcuate when viewed in cross section.

6. The computer keyboard and mouse support of claim 4 wherein the document holder slot is disposed in the front side of the back wall portion.

7. The computer keyboard and mouse support of claim 6 wherein the document holder slot is arcuate when viewed in plan view, the slot being wider in a middle portion and narrower adjacent ends of the slot.

8. The computer keyboard and mouse support of claim 7 wherein the slot is V-shaped when viewed in cross section and a bottom portion of the slot is parallel with a plane defined by the upper support surface.

9. The computer keyboard and mouse support of claim 1 wherein a non-slip material is affixed to the upper support surface to inhibit sliding of a keyboard placed on the upper support surface.

10. The computer keyboard and mouse support of claim 9 wherein the non-slip material comprises two pieces of resilient foam material adhesively affixed to recessed portions of the upper support surface such that a keyboard placed on the upper support surface would be supported by the two pieces of non-slip material.

11. The computer keyboard and mouse support of claim 1 wherein the keyboard support includes a keyboard cord holder in the back side of the keyboard support.

12. The computer keyboard and mouse support of claim 2 wherein the keyboard support includes a pair of spaced apart keyboard cord holders comprising a pair of passages through the back wall portion, one passage of the pair of passages being on located on one side of the document holder and the other passage being located on an opposite side of the document holder.

13. The computer keyboard and mouse support of claim 1 wherein the keyboard support includes a first mouse cord holder in the left side of the keyboard support and a second mouse cord holder in the right side of the keyboard support.

14. The computer keyboard and mouse support of claim 1 wherein the keyboard support includes first and second spaced apart mouse cord holder slots, the first mouse cord holder slot being in a first side wall portion of the keyboard support adjacent an intersection of the left side and the back side of the keyboard support and the second mouse cord holder slot being a second side wall portion of the keyboard support adjacent an intersection of the right side and the back side of the keyboard support.

15. The computer keyboard and mouse support of claim 1 wherein the keyboard support includes a wrist support adjacent a front side of the keyboard support.

16. A computer keyboard and mouse support comprising:
   a) a keyboard support having an upper support surface for supporting a computer keyboard and that defines a throughpassage extending between a left side and a right side of the keyboard support for slidably receiving a mouse support;
   b) the mouse support including first and second mouse support surfaces adjacent opposite ends of the mouse support, the mouse support being sized to slide within the keyboard support throughpassage between first and second positions, the mouse support being sized to slide within the keyboard support throughpassage between first and second positions, in the first position of the mouse support the first mouse support surface extending outwardly beyond the left side of the keyboard support and in the second position of the mouse support the second mouse support surface extending outwardly beyond the right side of the keyboard support; and
   c) wherein the upper support surface of the keyboard support includes a wrist support affixed to the upper support surface adjacent and extending rearwardly from a front side of the keyboard support and non-slip material affixed to the upper support surface rearwardly of the wrist support to inhibit sliding of a keyboard placed on the non-slip material.

17. The computer keyboard and mouse support of claim 16 wherein the non-slip material comprises two pieces of resilient foam material adhesively affixed to recessed portions of the upper support surface such that a keyboard placed on the upper support surface would be supported by the two pieces of non-slip material.

18. The computer keyboard and mouse support of claim 16 wherein the keyboard support further includes a document holder positioned near a back side of the keyboard support.

19. The computer keyboard and mouse support of claim 16 wherein a back wall portion extends forwardly along at least a portion of the back side of the keyboard support and the document holder comprises a slot in an upper surface of the back wall portion.

20. The computer keyboard and mouse support of claim 19 wherein the document holder slot is arcuate when viewed in plan view, the slot being wider in a middle portion and narrower adjacent ends of the slot.

21. The computer keyboard and mouse support of claim 19 wherein the back wall portion includes the back side of the keyboard support, a front side extending upwardly at an angle from the upper support surface and a middle section bridging the back and front sides of the back wall portion.

22. The computer keyboard and mouse support of claim 21 wherein the front side of the back wall portion is arcuate when viewed in cross section.

23. The computer keyboard and mouse support of claim 21 wherein the document holder slot is disposed in the front side of the back wall portion.

24. The computer keyboard and mouse support of claim 23 wherein the document holder slot is arcuate when viewed in plan view, the slot being wider in a middle portion and narrower adjacent ends of the slot.

25. The computer keyboard and mouse support of claim 24 wherein the slot is V-shaped when viewed in cross section and a bottom portion of the slot is parallel with a plane defined by the upper support surface.

26. The computer keyboard and mouse support of claim 16 wherein the keyboard support includes a keyboard cord holder in the back side of the keyboard support.

27. The computer keyboard and mouse support of claim 19 wherein the keyboard support includes a pair of spaced apart keyboard cord holders comprising a pair of passages through the back wall portion, one passage of the pair of passages being on located on one side of the document holder and the other passage being located on an opposite side of the document holder.

28. The computer keyboard and mouse support of claim 16 wherein the keyboard support includes a first mouse cord holder in the left side of the keyboard support and a second mouse cord holder in the right side of the keyboard support.

29. The computer keyboard and mouse support of claim 16 wherein the keyboard support includes first and second spaced apart mouse cord holder slots, the first mouse cord holder slot being in a first side wall portion of the keyboard support adjacent an intersection of the left side and the back side of the keyboard support and the second mouse cord holder slot being a second side wall portion of the keyboard support adjacent an intersection of the right side and the back side of the keyboard support.

30. A method of fabricating a computer keyboard and mouse support, the steps of the method comprising:
  a) providing a keyboard support including:
    1) a molded plastic keyboard support upper body, the body including a generally planar upper surface for supporting a keyboard, a lower surface, a front side, a left side, a right side and a back side, the back side including a back wall portion extends forwardly along at least a portion of the back side of the keyboard support and defining a document holder comprising a slot in an upper surface of the back wall portion;
    2) a keyboard support lower body adapted to be affixed to the lower surface of the plastic keyboard support upper body, the keyboard support upper body and lower body defining an arcuate throughpassage extending between a left side and a right side of the keyboard support;
  b) providing a mouse support including first and second mouse support surfaces adjacent opposite ends of the mouse support, the mouse support being sized to slide within the keyboard support throughpassage between first and second positions, the mouse support being sized to slide within the keyboard support throughpassage between first and second positions, in the first position of the mouse support the first mouse support surface extending outwardly beyond the left side of the keyboard support and in the second position of the mouse support the second mouse support surface extending outwardly beyond the right side of the keyboard support;
  c) aligning the keyboard support upper and lower bodies with the mouse support supported within the keyboard support throughpassage; and
  d) affixing the keyboard support upper and lower bodies together.

31. The method of fabricating a computer keyboard and mouse support of claim 30 wherein the keyboard support upper body is fabricated by injection molding.

32. The method of fabricating a computer keyboard and mouse support of claim 30 wherein the keyboard support lower body is steel and is formed by stamping.

33. The method of fabricating a computer keyboard and mouse support of claim 30 wherein the mouse support is a plastic resin material fabricated by injection molding.

34. The method of fabricating a computer keyboard and mouse support of claim 30 wherein the keyboard support upper and lower bodies are affixed by fasteners extending between the upper and lower bodies.

35. The method of fabricating a computer keyboard and mouse support of claim 30 further including the step of:
  e) affixing a wrist support to the upper surface of the keyboard support upper body adjacent the front side of the upper body.

36. The method of fabricating a computer keyboard and mouse support of claim 35 further including the step of:
  f) affixing non-slip material to the upper support surface rearwardly of the wrist support to inhibit sliding of a keyboard placed on the non-slip material.

37. The method of fabricating a computer keyboard and mouse support of claim 30 wherein a lower surface of the mouse support includes an arcuate slot and an upper surface of the keyboard support lower body includes an upwardly extending pin that fits into the arcuate slot to limit an extent of sliding movement of the mouse support with respect to the keyboard support.

38. A computer keyboard and mouse support comprising:
  a) a keyboard support having an upper support surface for supporting a computer keyboard and that defines a throughpassage extending between a left side and a right side of the keyboard support for slidably receiving a mouse support;
  b) the mouse support including first and second mouse support surfaces adjacent opposite ends of the mouse support, the mouse support being sized to slide within the keyboard support throughpassage between first and second positions, in the first position of the mouse support the first mouse support surface extending outwardly beyond the left side of the keyboard support and in the second position of the mouse support the second mouse support surface extending outwardly beyond the right side of the keyboard support; and
  c) wherein the keyboard support includes a document holder positioned near a back side of the keyboard support and wherein a back wall portion extends forwardly along at least a portion of the back side of the keyboard support and the document holder comprises a slot in an upper surface of the back wall portion and further wherein the document holder slot is arcuate when viewed in plan view, the slot being wider in a middle portion and narrower adjacent ends of the slot.

39. A computer keyboard and mouse support comprising:

a) a keyboard support having an upper support surface for supporting a computer keyboard and that defines a throughpassage extending between a left side and a right side of the keyboard support for slidably receiving a mouse support;

b) the mouse support including first and second mouse support surfaces adjacent opposite ends of the mouse support, the mouse support being sized to slide within the keyboard support throughpassage between first and second positions, in the first position of the mouse support the first mouse support surface extending outwardly beyond the left side of the keyboard support and in the second position of the mouse support the second mouse support surface extending outwardly beyond the right side of the keyboard support; and c) wherein the keyboard support includes a document holder positioned near a back side of the keyboard support and wherein a back wall portion extends forwardly along at least a portion of the back side of the keyboard support and the document holder comprises a slot in an upper surface of the back wall portion and further wherein the back wall portion includes the back side of the keyboard support, a front side extending upwardly at an angle from the upper support surface and a middle section bridging the back and front sides of the back wall portion.

40. The computer keyboard and mouse support of claim 39 wherein the front side of the back wall portion is arcuate when viewed in cross section.

41. The computer keyboard and mouse support of claim 39 wherein the document holder slot is disposed in the front side of the back wall portion.

42. The computer keyboard and mouse support of claim 41 wherein the document holder slot is arcuate when viewed in plan view, the slot being wider in a middle portion and narrower adjacent ends of the slot.

43. The computer keyboard and mouse support of claim 42 wherein the slot is V-shaped when viewed in cross section and a bottom portion of the slot is parallel with a plane defined by the upper support surface.

44. A computer keyboard and mouse support comprising:

a) a keyboard support having an upper support surface for supporting a computer keyboard and that defines a throughpassage extending between a left side and a right side of the keyboard support for slidably receiving a mouse support;

b) the mouse support including first and second mouse support surfaces adjacent opposite ends of the mouse support, the mouse support being sized to slide within the keyboard support throughpassage between first and second positions, in the first position of the mouse support the first mouse support surface extending outwardly beyond the left side of the keyboard support and in the second position of the mouse support the second mouse support surface extending outwardly beyond the right side of the keyboard support; and c) wherein the keyboard support includes a document holder positioned near a back side of the keyboard support and further wherein the keyboard support includes first and second spaced apart mouse cord holder slots, the first mouse cord holder slot being in a first side wall portion of the keyboard support adjacent an intersection of the left side and the back side of the keyboard support and the second mouse cord holder slot being a second side wall portion of the keyboard support adjacent an intersection of the right side and the back side of the keyboard support.

45. A computer keyboard and mouse support comprising:

a) a keyboard support having an upper support surface for supporting a computer keyboard and that defines a throughpassage extending between a left side and a right side of the keyboard support for slidably receiving a mouse support;

b) the mouse support including first and second mouse support surfaces adjacent opposite ends of the mouse support, the mouse support being sized to slide within the keyboard support throughpassage between first and second positions, the mouse support being sized to slide within the keyboard support throughpassage between first and second positions, in the first position of the mouse support the first mouse support surface extending outwardly beyond the left side of the keyboard support and in the second position of the mouse support the second mouse support surface extending outwardly beyond the right side of the keyboard support; and c) wherein the upper support surface of the keyboard support includes a wrist support affixed to the upper support surface adjacent a front side of the keyboard support and non-slip material affixed to the upper support surface rearwardly of the wrist support to inhibit sliding of a keyboard placed on the non-slip material and wherein a back wall portion extends forwardly along at least a portion of the back side of the keyboard support and the document holder comprises a slot in an upper surface of the back wall portion and further wherein the document holder slot is arcuate when viewed in plan view, the slot being wider in a middle portion and narrower adjacent ends of the slot.

46. A computer keyboard and mouse support comprising:

a) a keyboard support having an upper support surface for supporting a computer keyboard and that defines a throughpassage extending between a left side and a right side of the keyboard support for slidably receiving a mouse support;

b) the mouse support including first and second mouse support surfaces adjacent opposite ends of the mouse support, the mouse support being sized to slide within the keyboard support throughpassage between first and second positions, the mouse support being sized to slide within the keyboard support throughpassage between first and second positions, in the first position of the mouse support the first mouse support surface extending outwardly beyond the left side of the keyboard support and in the second position of the mouse support the second mouse support surface extending outwardly beyond the right side of the keyboard support; and c) wherein the upper support surface of the keyboard support includes a wrist support affixed to the upper support surface adjacent a front side of the keyboard support and non-slip material affixed to the upper support surface rearwardly of the wrist support to inhibit sliding of a keyboard placed on the non-slip material and wherein a back wall portion extends forwardly along at least a portion of the back side of the keyboard support and the document holder comprises a slot in an upper surface of the back wall portion and further wherein the back wall portion includes the back side of the keyboard support, a front side extending upwardly at an angle from the upper support surface and a middle section bridging the back and front sides of the back wall portion.

47. The computer keyboard and mouse support of claim 46 wherein the front side of the back wall portion is arcuate when viewed in cross section.

48. The computer keyboard and mouse support of claim 46 wherein the document holder slot is disposed in the front side of the back wall portion.

49. The computer keyboard and mouse support of claim 48 wherein the document holder slot is arcuate when viewed in plan view, the slot being wider in a middle portion and narrower adjacent ends of the slot.

50. The computer keyboard and mouse support of claim 49 wherein the slot is V-shaped when viewed in cross section and a bottom portion of the slot is parallel with a plane defined by the upper support surface.

51. A computer keyboard and mouse support comprising:
   a) a keyboard support having an upper support surface for supporting a computer keyboard and that defines a throughpassage extending between a left side and a right side of the keyboard support for slidably receiving a mouse support;
   b) the mouse support including first and second mouse support surfaces adjacent opposite ends of the mouse support, the mouse support being sized to slide within the keyboard support throughpassage between first and second positions, the mouse support being sized to slide within the keyboard support throughpassage between first and second positions, in the first position of the mouse support the first mouse support surface extending outwardly beyond the left side of the keyboard support and in the second position of the mouse support the second mouse support surface extending outwardly beyond the right side of the keyboard support; and
   c) wherein the upper support surface of the keyboard support includes a wrist support affixed to the upper support surface adjacent a front side of the keyboard support and non-slip material affixed to the upper support surface rearwardly of the wrist support to inhibit sliding of a keyboard placed on the non-slip material and further wherein the keyboard support includes first and second spaced apart mouse cord holder slots, the first mouse cord holder slot being in a first side wall portion of the keyboard support adjacent an intersection of the left side and the back side of the keyboard support and the second mouse cord holder slot being a second side wall portion of the keyboard support adjacent an intersection of the right side and the back side of the keyboard support.

52. A method of fabricating a computer keyboard and mouse support, the steps of the method comprising:
   a) providing a keyboard support including:
      1) a molded plastic keyboard support upper body, the body including a generally planar upper surface for supporting a keyboard, a lower surface, a front side, a left side, a right side and a back side, the back side including a back wall portion extends forwardly along at least a portion of the back side of the keyboard support and defining a document holder comprising a slot in an upper surface of the back wall portion;
      2) a keyboard support lower body adapted to be affixed to the lower surface of the plastic keyboard support upper body, the keyboard support upper body and lower body defining an arcuate throughpassage extending between a left side and a right side of the keyboard support, wherein the keyboard support lower body is steel and is formed by stamping;
   b) providing a mouse support including first and second mouse support surfaces adjacent opposite ends of the mouse support, the mouse support being sized to slide within the keyboard support throughpassage between first and second positions, the mouse support being sized to slide within the keyboard support throughpassage between first and second positions, in the first position of the mouse support the first mouse support surface extending outwardly beyond the left side of the keyboard support and in the second position of the mouse support the second mouse support surface extending outwardly beyond the right side of the keyboard support;
   c) aligning the keyboard support upper and lower bodies with the mouse support supported within the keyboard support throughpassage; and
   d) affixing the keyboard support upper and lower bodies together.

* * * * *